(12) United States Patent
Kaimori et al.

(10) Patent No.: US 9,239,082 B2
(45) Date of Patent: Jan. 19, 2016

(54) ROTOR AND ROTATING ELECTRIC MACHINE EQUIPPED WITH THE ROTOR

(75) Inventors: Tomoaki Kaimori, Hitachinaka (JP); Kenichi Nakayama, Hitachinaka (JP); Yasuyuki Saito, Hitachinaka (JP); Dai Ikeda, Zama (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 559 days.

(21) Appl. No.: 13/578,466

(22) PCT Filed: Aug. 23, 2010

(86) PCT No.: PCT/JP2010/064188
§ 371 (c)(1),
(2), (4) Date: Nov. 2, 2012

(87) PCT Pub. No.: WO2011/102011
PCT Pub. Date: Aug. 25, 2011

(65) Prior Publication Data
US 2013/0043761 A1      Feb. 21, 2013

(30) Foreign Application Priority Data

Feb. 16, 2010   (JP) ................. 2010-031182

(51) Int. Cl.
*H02K 1/28*        (2006.01)
*F16D 1/08*        (2006.01)
(52) U.S. Cl.
CPC ............. *F16D 1/0876* (2013.01); *H02K 1/28* (2013.01)
(58) Field of Classification Search
None
See application file for complete search history.

(56) References Cited

U.S. PATENT DOCUMENTS 6,577,033 B1      6/2003   Sekine
2010/0013350 A1*  1/2010   Fu .............................. 310/261.1

FOREIGN PATENT DOCUMENTS

JP      2000-179643 A      6/2000
JP      2002-174535 A      6/2002

(Continued)

*Primary Examiner* — Tran Nguyen
(74) *Attorney, Agent, or Firm* — Volpe and Koenig, P.C.

(57) ABSTRACT

A rotor comprising: a rotating shaft with at least one keyway formed at an outer circumferential surface thereof and ranging along an axial direction; and a rotor core that includes a key that projects out on an inner circumferential side thereof, and is fitted in the keyway; wherein: a recessed portion that widens outward along a radial direction is formed at each of two sides of the key facing opposite each other along a circumferential direction at the rotor core; a planar portion is formed at a bottom area of the recessed portion so as to lessen stress occurring on each of the two sides of the key facing opposite each other along the circumferential direction; the planar portion is a straight contoured portion extending over a predetermined length along a direction perpendicular to a direction in which the key projects out, and a connecting side surface extending to an inner circumference of the rotor core is formed continuously to an end of the straight contoured portion located on a side opposite from a key side where a key is present; a first corner portion, connecting a side surface of the key with a key-side end of the straight contoured portion, is formed as a circular arc contoured portion; a second corner portion, connecting the end of the straight contoured portion, located on the side opposite from the key side, with the connecting side surface, is formed as a circular arc contoured portion; and dimensions and shapes of various portions are determined so as to substantially equalize stress levels in the first corner portion and in the second corner portion.

2 Claims, 23 Drawing Sheets

(56) References Cited

FOREIGN PATENT DOCUMENTS

| | | | |
|---|---|---|---|
| JP | 2008-187804 A | 8/2008 | |
| JP | 2008-312321 A | 12/2008 | |
| JP | 2009-201258 A | 9/2009 | |
| JP | 2011-036068 A | 2/2011 | |
| WO | WO 2008093622 A1 * | 8/2008 | ........ 310/261.1 |

* cited by examiner

ROTOR AND ROTATING ELECTRIC MACHINE EQUIPPED WITH THE ROTOR

TECHNICAL FIELD

The present invention relates to a fastening structure that may be adopted when fastening a rotor of a rotating electric machine to a rotating shaft member.

BACKGROUND ART

A rotating electric machine used to drive a vehicle needs to rotate at a speed higher than the speed at which a standard rotating electric machine typically rotates in a different application and therefore, it is crucial that the rotor thereof achieve a sufficiently high level of strength. It is particularly important to assure a high level of strength over the area where the rotor core is fastened to the rotating shaft member. While the rotor core and the rotating shaft member constituting a rotor in the related art are often fastened together by using a clearance-fitted key, there is a concern that stress tends to concentrate readily at the key.

This issue is addressed in patent literature 1, disclosing a rotor that includes a recessed part at the key, which assumes a shape achieved by forming, continuous to each other, at a key side surface, a circular arc part having a first radius of curvature and a circular arc part having a second radius of curvature greater than the first radius of curvature, so as to reduce the extent of stress concentration.

However, a stress reducing effect greater than that disclosed in patent literature 1 is sought in order to meet the increasing need for improved rotating electric machine performance. The rotating electric machine disclosed in patent literature 2 is characterized in that the contour of a notch located at the base end of the key includes a first R (round) part extending from the key base end, a straight part extending from the first R part along a direction perpendicular to a key side end, a second R part extending from the straight part and a transition part extending from the second R part to the inner edge of a through hole formed in a core plate.

CITATION LIST

Patent Literature

Patent literature 1: Japanese Laid Open Patent Publication No. 2008-312321
Patent literature 2: Japanese Laid Open Patent Publication No. 2009-201258

SUMMARY OF THE INVENTION

Technical Problem

However, the rotating electric machine disclosed in patent literature 2, in which stress concentration does not occur in the first R part and the second R part by dispersing stress through the straight part, still leaves room for improvement with regard to optimal stress distribution over the entire key.

Solution to Problems

According to the first aspect of the present invention, a rotor, comprising: a rotating shaft with at least one keyway formed at an outer circumferential surface thereof and ranging along an axial direction; and a rotor core that includes a key that projects out on an inner circumferential side thereof, and is fitted in the keyway, wherein: a recessed portion that widens outward along a radial direction is formed at each of two sides of the key facing opposite each other along a circumferential direction at the rotor core; a planar portion is formed at a bottom area of the recessed portion so as to lessen stress occurring on each of the two sides of the key facing opposite each other along the circumferential direction; the planar portion is a straight contoured portion extending over a predetermined length along a direction perpendicular to a direction in which the key projects out, and a connecting side surface extending to an inner circumference of the rotor core is formed continuously to an end of the straight contoured portion located on a side opposite from a key side where a key is present; a first corner portion, connecting a side surface of the key with a key-side end of the straight contoured portion, is formed as a circular arc contoured portion; a second corner portion, connecting the end of the straight contoured portion, located on the side opposite from the key side, with the connecting side surface, is formed as a circular arc contoured portion; and dimensions and shapes of various portions are determined so as to substantially equalize stress levels in the first corner portion and in the second corner portion.

According to the second aspect of the present invention, a rotor, comprising: a rotating shaft with at least one keyway formed at an outer circumferential surface thereof and ranging along an axial direction; and a rotor core that includes a key that projects out on an inner circumferential side thereof, and is fitted in the keyway, wherein: a recessed portion that widens outward along a radial direction is formed at each of two sides of the key facing opposite each other along a circumferential direction at the rotor core; a planar portion is formed at a bottom area of the recessed portion so as to lessen stress occurring on each of the two sides of the key facing opposite each other along the circumferential direction; the planar portion is a straight contoured portion extending over a predetermined length along a direction perpendicular to a direction in which the key projects out, and a connecting side surface extending to an inner circumference of the rotor core is formed continuously to an end of the straight contoured portion located on a side opposite from a key side where a key is present; a first corner portion, connecting a side surface of the key with a key-side end of the straight contoured portion, is formed as a circular arc contoured portion; a second corner portion, connecting the end of the straight contoured portion, located on the side opposite from the key side, with the connecting side surface, is formed as a circular arc contoured portion; and an angle formed by the side surface of the key and the straight contoured portion and an angle formed by the straight contoured portion and the connecting side surface are determined so as to substantially equalize stress levels in the first corner portion and in the second corner portion.

According to the third aspect of the present invention, in the rotor of the second aspect, it is preferred that the length over which the straight contoured portion extends is determined so as to substantially equalize the stress levels in the first corner portion and in the second corner portion.

According to the fourth aspect of the present invention, a rotor, comprising: a rotating shaft with at least one keyway formed at an outer circumferential surface thereof and ranging along an axial direction; and a rotor core that includes a key that projects out on an inner circumferential side thereof, and is fitted in the keyway, wherein: a recessed portion that widens outward along a radial direction is formed at each of two sides of the key facing opposite each other along a circumferential direction at the rotor core; a planar portion is formed at a bottom area of the recessed portion so as to lessen stress occurring on each of the two sides of the key facing opposite each other along the circumferential direction; the planar portion is a straight contoured portion extending over a predetermined length along a direction perpendicular to a direction in which the key projects out, and a connecting side surface extending to an inner circumference of the rotor core is formed continuously to an end of the straight contoured portion located on a side opposite from a key side where a key is present; a first corner portion, connecting a side surface of the key with a key-side end of the straight contoured portion, is formed as a circular arc contoured portion; a second corner portion, connecting the end of the straight contoured portion, located on the side opposite from the key side, with the connecting side surface, is formed as a circular arc contoured portion; and the length over which the planar portion extends, an angle formed by the side surface of the key and the straight contoured portion, an angle formed by the straight contoured portion and the connecting side surface, a radius of curvature of the first corner portion and the radius of curvature of the second corner portion are determined so as to substantially equalize stress levels in the first corner portion in the second corner portion.

According to the fifth aspect of the present invention, a rotor, comprising: a rotating shaft with at least one keyway formed at an outer circumferential surface thereof and ranging along an axial direction; and a rotor core that includes a key that projects out on an inner circumferential side thereof and is fitted in the keyway, wherein: a recessed portion that widens outward along a radial direction is formed at each of two sides of the key, facing opposite each other along a circumferential direction, at the rotor core; and a recessed circular arc contoured portion, which is recessed along the inner circumference, is formed at a bottom area of the recessed portion.

According to the sixth aspect of the present invention, in the rotor of the fifth aspect, it is preferred that a radius of the circular arc contoured portion is determined so that a level of stress generated near the key, due to centrifugal force acting on the rotor core as the rotor rotates, never exceeds a predetermined threshold value.

According to the seventh aspect of the present invention, in the rotor of the sixth aspect, it is preferred that the radius of the circular arc contoured portion is equal to or greater than one tenth a radius of the rotor core measured at the inner circumference thereof.

According to the eighth aspect of the present invention, in the rotor of the fifth aspect, it is preferred that a connecting side surface extending to the inner circumference of the rotor core is formed continuously from an end of the circular arc contoured portion located on the side opposite from a key side where the key is present; a first corner portion, connecting a side surface of the key with a key-side end of the circular arc contoured portion is formed as a circular arc; and a second corner portion connecting the end of the circular arc contoured portion located on the side opposite from the key side, with the connecting side surface, is formed as a circular arc.

According to the ninth aspect of the present invention, in the rotor of the eighth aspect, it is preferred that a radius of the circular arc contoured portion, a radius of curvature of the circular arc at the first corner portion and the radius of curvature of the circular arc at the second corner portion are determined so that a level of stress generated near the key, due to centrifugal force acting on the rotor core as the rotor rotates, never exceeds a predetermined threshold value.

According to the tenth aspect of the present invention, in the rotor of the first aspect, it is preferred that an angle formed by the side surface of the key and the bottom area is equal to or greater than 85° and less than 90°.

According to the eleventh aspect of the present invention, in the rotor of the first aspect, it is preferred that an angle formed by the side surface of the key and the bottom area is greater than 90°.

According to the twelfth aspect of the present invention, a rotating electric machine, comprising: the rotor of the first aspect; and a stator disposed on an outer circumference side of the rotor with an air gap separating the stator from the rotor.

Advantageous Effect of the Invention

According to the present invention, the extent of stress concentration in the key of a rotor that transmits rotational torque to a rotating shaft can be reduced by adopting a simple structure and furthermore, optimal stress dispersal over the entire key is achieved.

DESCRIPTION OF EMBODIMENTS

First Embodiment

The first embodiment of the rotating electric machine according to the present invention is now described.

(Overall Rotating Electric Machine)

The rotating electric machine in the first embodiment of the present invention assures higher rotation speed, as detailed below. For this reason, it is ideal in applications in which it is used as a traveling motor for an electric vehicle. While the rotating electric machine according to the present invention may be adopted in a pure electric vehicle engaged in traveling operation exclusively on a rotating electric machine or in a hybrid-type electric vehicle driven both by an engine and a rotating electric machine, the following description is given by assuming that the present invention is adopted in a hybrid electric vehicle.

Figure 1:
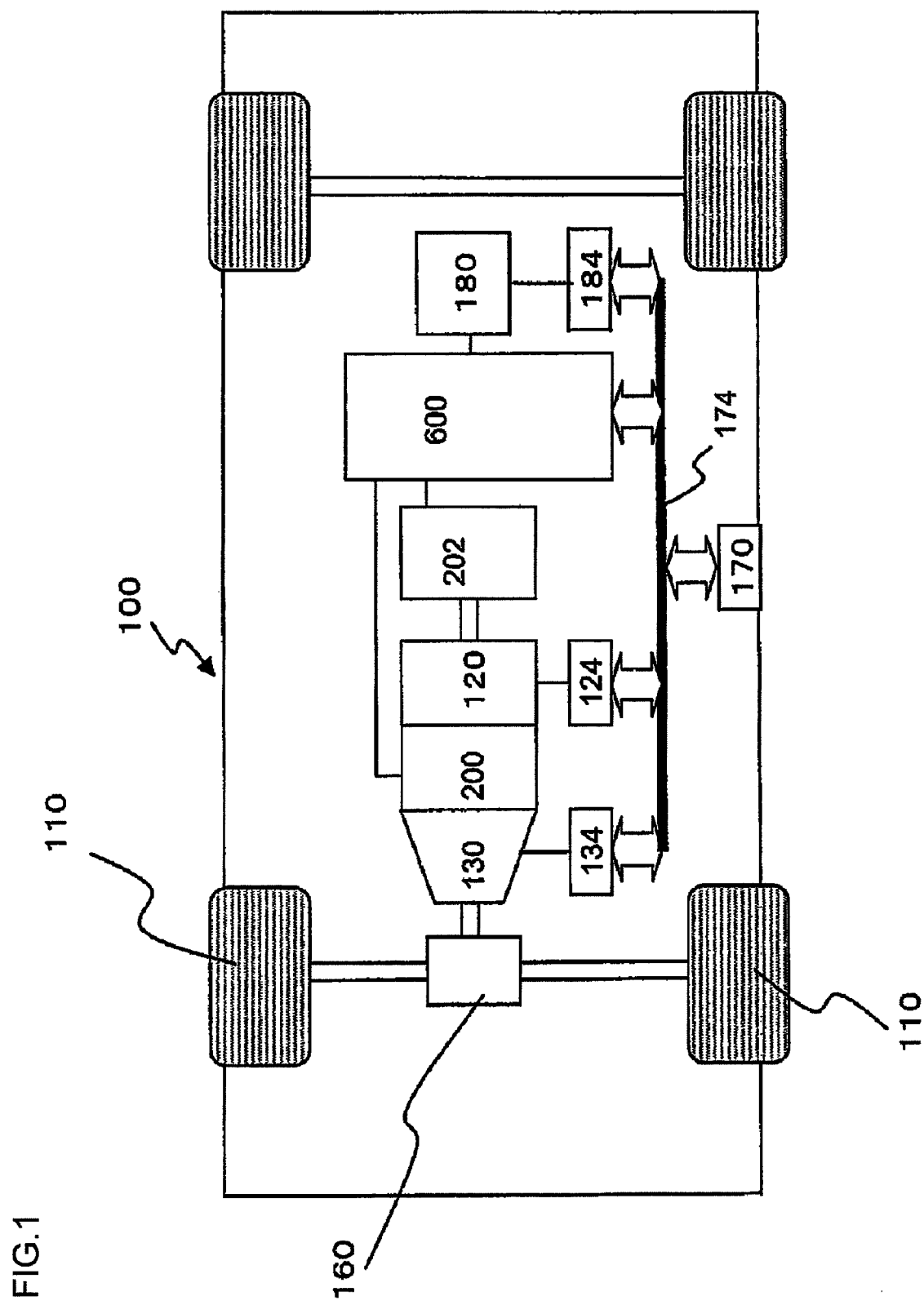
FIG. 1 A schematic illustration showing the structure of a hybrid electric vehicle having installed therein a rotating electric machine equipped with a rotor achieved in a first embodiment of the present invention FIG. 2 A circuit diagram pertaining to the power conversion device in FIG. 1

An engine 120, a first rotating electric machine 200, a second rotating electric machine 202 and a high-voltage battery 180 are mounted at a hybrid vehicle 100, as shown in FIG. 1.

The battery 180, constituted with secondary battery cells such as lithium ion battery cells or nickel hydride battery cells, is capable of outputting high-voltage DC power in a range of 250 to 600 V or higher. The battery 180 provides DC power to the rotating electric machines 200 and 202 when drive forces imparted by the rotating electric machines 200 and 202 are required, whereas it receives DC power from the rotating electric machines 200 and 202 during a regenerative traveling operation. The battery 180 and the rotating electric machines 200 and 202 exchange DC power via a power conversion device 600.

In addition, although not shown, a battery that provides low-voltage power (e.g., 14 V power) is installed in the vehicle so as to supply DC power to the control circuits to be described below.

Rotational torque generated via the engine 120 and the rotating electric machines 200 and 202 is transmitted to front wheels 110 via a transmission 130 and a differential gear unit 160. The transmission 130 is controlled by a transmission control device 134, whereas the engine 120 is controlled by an engine control device 124. The battery 180 is controlled by a battery control device 184.

The transmission control device 134, the engine control device 124, the battery control device 184, and the power conversion device 600 are connected with an integrated control device 170 via a communication line 174.

The integrated control device 170 manages torque outputs from the engine 120 and the rotating electric machines 200 and 202, executes arithmetic processing to calculate the overall torque representing the sum of the torque output from the engine 120 and the torques output from the rotating electric machines 200 and 202, and a torque distribution ratio, and transmits control commands generated based upon the arithmetic processing results to the transmission control device 134, the engine control device 124 and the power conversion device 600. For these purposes, the integrated control device 170 receives information input thereto via the communication line 174, which originate from the transmission control device 134, the engine control device 124, the power conversion device 600 and the battery control device 184, and indicates the statuses at the individual control devices. These control devices are lower-order devices relative to the integrated control device 170. Based upon the information thus received, the integrated control device 170 generates through arithmetic operation a control command for each corresponding control device. The control command generated through the arithmetic operation is then transmitted to the particular control device via the communication line 174.

The battery control device 184 outputs, via the communication line 174, information indicating the state of discharge in the battery 180 and the states of the individual battery cell units constituting the battery 180 to the integrated control device 170. The integrated control device 170 controls the power conversion device 600 based upon the information provided by the battery control device 184, and upon deciding that the battery 180 needs to be charged, it issues a power generation operation instruction for the power conversion device 600.

Based upon a torque command issued by the integrated control device 170, the power conversion device 600 controls the rotating electric machines 200 and 202 so as to output torque or generate power as indicated in the command. For these purposes, the power conversion device 600 includes power semiconductors that constitute inverters via which the rotating electric machines 200 and 202 are engaged in operation. The power conversion device 600 controls switching operation of the power semiconductors based upon a command issued by the integrated control device 170. As the power semiconductors are engaged in the switching operation as described above, the rotating electric machines 200 and 202 are each driven operate as an electric motor or a power generator.

When engaging the rotating electric machines 200 and 202 in operation as electric motors, DC power provided from the high-voltage battery 180 is supplied to DC terminals of the inverters in the power conversion device 600. The power conversion device 600 controls the switching operation of the power semiconductors so as to convert the DC power supplied to the inverters to three-phase AC power and provides the three-phase AC power to the rotating electric machines 200 and 202.

When engaging the rotating electric machines 200 and 202 in operation as generators, the rotors of the rotating electric machines 200 and 202 are rotationally driven with a rotational torque applied thereto from the outside and thus, three-phase AC power is generated at the stator windings of the rotating electric machines 200 and 202. The three-phase AC power thus generated is converted to DC power in the power conversion device 600 and the high-voltage battery 180 is charged with the DC power supplied thereto.

(Power Conversion Device)

Figure 2:
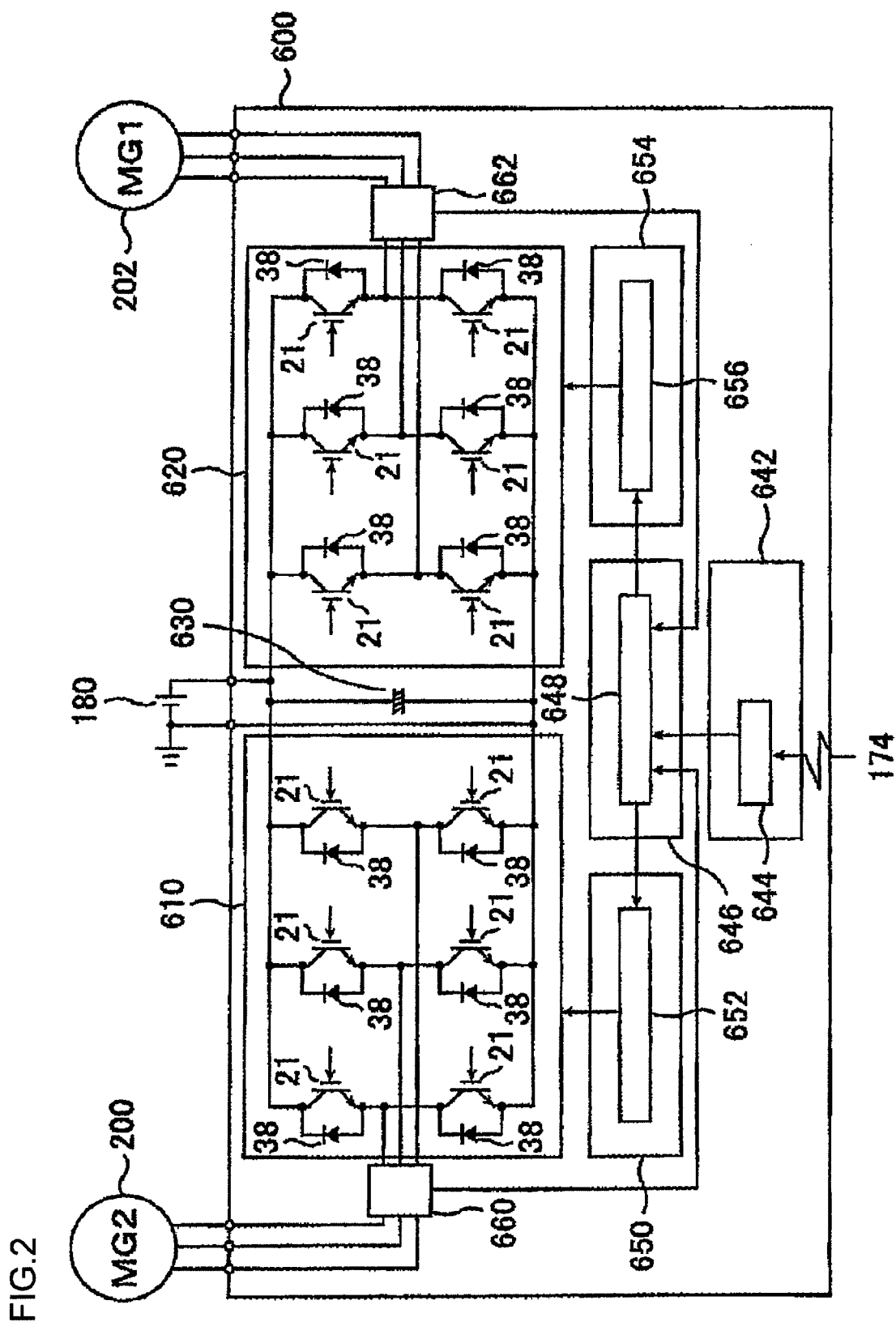

As shown in FIG. 2, the power conversion device 600 includes a first inverter device for the rotating electric machine 200 and a second inverter device for the rotating electric machine 202. The first inverter device comprises a power module 610, a first drive circuit 652 that controls switching operation of power semiconductors 21 in the power module 610 and a current sensor 660 that detects an electric current at the rotating electric machine 200. The drive circuit 652 is disposed at a drive circuit substrate 650.

The second inverter device comprises a power module 620, a second drive circuit 656 that controls switching operation of power semiconductors 21 in the power module 620 and a current sensor 662 that detects an electric current at the rotating electric machine 202. The drive circuit 656 is disposed at a drive circuit substrate 654.

The current sensors 660 and 662 and the drive circuits 652 and 656 are connected to a control circuit 648 disposed at a control circuit substrate 646, and the communication line 174 is connected via a transmission/reception circuit 644, to the control circuit 648. The transmission/reception circuit 644 is a common circuit serving both the first inverter device and the second inverter device. The transmission/reception circuit 644, via which the power conversion device 600 is electrically connected with an external control device, enables information exchange with another device via the communication line 174 shown in FIG. 1.

The control circuit 648, which controls the inverter devices 610 and 620, is constituted with a microcomputer that generates, through arithmetic operation, a control signal (control value) based upon which the power semiconductor elements 21 are engaged in operation (turned on/off). A torque command signal (a torque command value) provided from the higher-order control device 170, sensor outputs from the current sensors 660 and 662, and sensor outputs from rotation sensors (resolvers 224, see FIG. 3 mounted at the rotating electric machines 200 and 202 are input to the control circuit 648. Based upon these signals input thereto, the control circuit 648 calculates control values and outputs control signals to the drive circuits 652 and 656 so as to control the switching timing.

The drive circuits 652 and 656 each include six integrated circuits that generate drive signals, each to be provided to the gate of one of the two arms, i.e., an upper arm and a lower arm, corresponding to a specific phase. In other words, each drive circuit is configured as a single circuit block constituted with the six integrated circuits. The drive signals generated at the drive circuits 652 and 656 are respectively output to the gates of the various power semiconductor elements 21 in the corresponding power modules 610 and 620.

A capacitor module 630, electrically connected in parallel to DC-side terminals at the power modules 610 and 620, constitutes a smoothing circuit that suppresses fluctuation of DC voltages, that would otherwise occur as the power semiconductor elements 21 are engaged in switching operation. The capacitor module 630 is a common component serving both the first inverter device and the second inverter device.

The power modules 610 and 620 each convert the DC power provided from the battery 180 to three-phase AC power and provide the three-phase AC power resulting from the conversion to a stator winding constituting an armature winding of the corresponding rotating electric machine 200 or 202. In addition, the power modules 610 and 620 convert AC power induced at the stator windings of the rotating electric machines 200 and 202 to DC power and provide the DC power resulting from the conversion to the high-voltage battery 180. As indicated in FIG. 2, the power modules 610 and 620 each include a three-phase bridge circuit constituted with serial circuits each corresponding to one of the three phases, electrically connected in parallel between the positive pole side and the negative pole side of the battery 180. Each serial circuit includes a power semiconductor 21 constituting an upper arm and a power semiconductor 21 constituting a lower arm, and these power semiconductors 21 are connected in series.

Since the power module 610 and the power module 620 adopt circuit structures substantially identical to each other, the following description focuses on the power module 610 chosen as a representative example.

The switching power semiconductor elements in the power module 610 are IGBTs (insulated gate bipolar transistors) 21. An IGBT 21 includes three electrodes; a collector electrode, an emitter electrode and a gate electrode. A diode 38 is electrically connected between the collector electrode and the emitter electrode of the IGBT 21. The diode 38 includes two electrodes; a cathode electrode and an anode electrode, with the cathode electrode electrically connected to the collector electrode of the IGBT 21 and the anode electrode electrically connected to the emitter electrode of the IGBT 21 so as to define the direction running from the emitter electrode toward the collector electrode at the IGBT 21 as a forward direction.

The upper and lower arms in the serial circuit corresponding to a given phase are configured by electrically connecting the emitter electrode of one IGBT 21 and the collector electrode of another IGBT 21 in series.

It is to be noted that while FIG. 2 shows the upper arm and the lower arm corresponding to a given phase each constituted with a single IGBT, a large current control capacity needs to be assured in practical use and thus, a plurality of IGBTs are connected in parallel to constitute an upper arm or a lower arm in reality. However, for purposes of simplification, the following explanation is given by assuming that each arm is constituted with a single power semiconductor.

In the embodiment described in reference to FIG. 2, each upper arm or lower arm, corresponding to one of the three phases, is actually configured with three IGBTs. The collector electrode of the IGBT 21 constituting the upper arm in a given phase is electrically connected to the positive pole side of the battery 180, whereas the emitter electrode of the IGBT 21 constituting the lower arm in a given phase is electrically connected to the negative pole side of the battery 180. A middle point between the arms corresponding to each phase (an area where the emitter electrode of the upper arm-side IGBT and the collector electrode of the lower arm-side IGBT are connected) is electrically connected to the armature winding (stator winding) of the corresponding phase at the corresponding rotating electric machine 200 or 202.

It is to be noted that MOSFETs (metal oxide semiconductor field effect transistors) may be used as the switching power semiconductor elements, instead. A MOSFET includes three electrodes; a drain electrode, a source electrode and a gate electrode. The MOSFET does not require a diode 38 such as those shown in FIG. 2, since it includes a parasitic diode with which the direction running from the drain electrode toward the source electrode is defined as the forward direction, present between the source electrode and the drain electrode.

Since the structure of the rotating electric machine 202 is substantially identical to that of the rotating electric machine 200, the following description focuses on the structure adopted in the rotating electric machine 200, serving as a representative example.

(Stator and Rotor)

Figure 3:
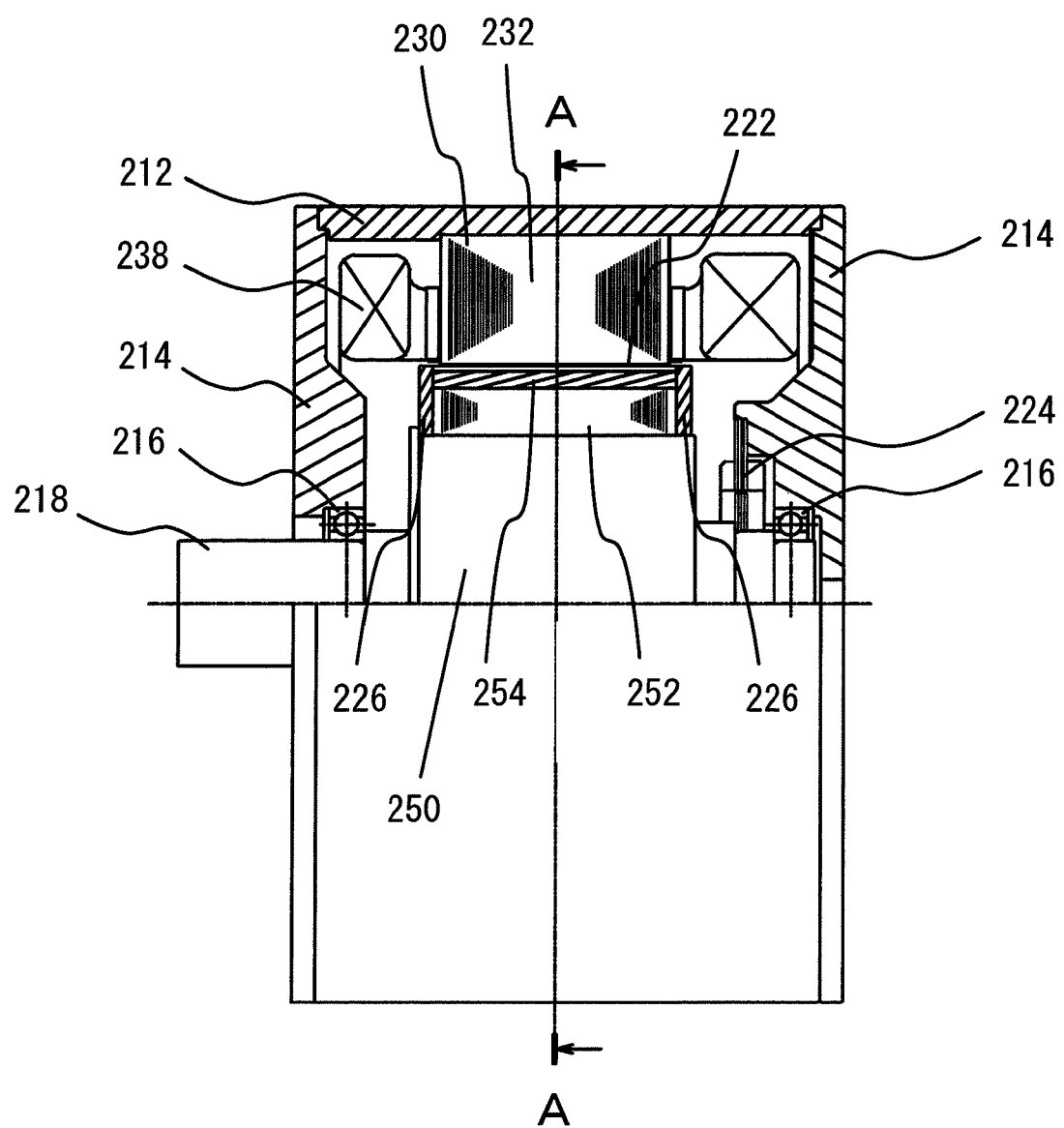
FIG. 3 A sectional view of a rotating electric machine in FIG. 1

As shown in FIG. 3, the rotating electric machine 200 includes a housing 212 and a stator 230 held inside the housing 212. The stator 230 is constituted with a stator core 232 and a stator winding 238. Inside the stator core 232, a rotor 250 is rotatably held over an air gap 222. The rotor 250 includes a rotor core 252, permanent magnets 254 and non-magnetic contact plates 226. The rotor core 252 is locked to a shaft (rotating shaft member) 218 assuming the cylindrical shape).

The housing 212 includes a pair of end brackets 214 at each of which a bearing 216 is disposed. The shaft 218 is rotatably held via the bearings 216. A resolver 224, which detects the positions of the poles at the rotor 250 and the rotation speed of the rotor 250, is disposed at the shaft 218. An output from the resolver 224 is taken into the control circuit 648 shown in FIG. 2.

The control executed by the control circuit 648 is explained in reference to FIG. 2. The control circuit 648 controls the drive circuit 652 based upon the output from the resolver 224, and the drive circuit 652, in turn, engages the power module 610 in switching operation so as to convert the DC power supplied from the battery 180 to three-phase AC power. The control circuit 648 likewise engages the power module 620 in switching operation via the drive circuit 656 and thus converts the DC power supplied from the battery 180 to three-phase AC power. This three-phase AC power is provided to the stator winding 238 and, as a result, a rotating magnetic field is generated at the stator 230. The frequency of the three-phase AC current is controlled based upon a detection value provided by the resolver 224, and the phases of the three-phase AC currents relative to the rotor 250 are also controlled based upon a detection value provided by the resolver 224. The stator winding 238 is thus provided with three-phase AC power.

Figure 4:
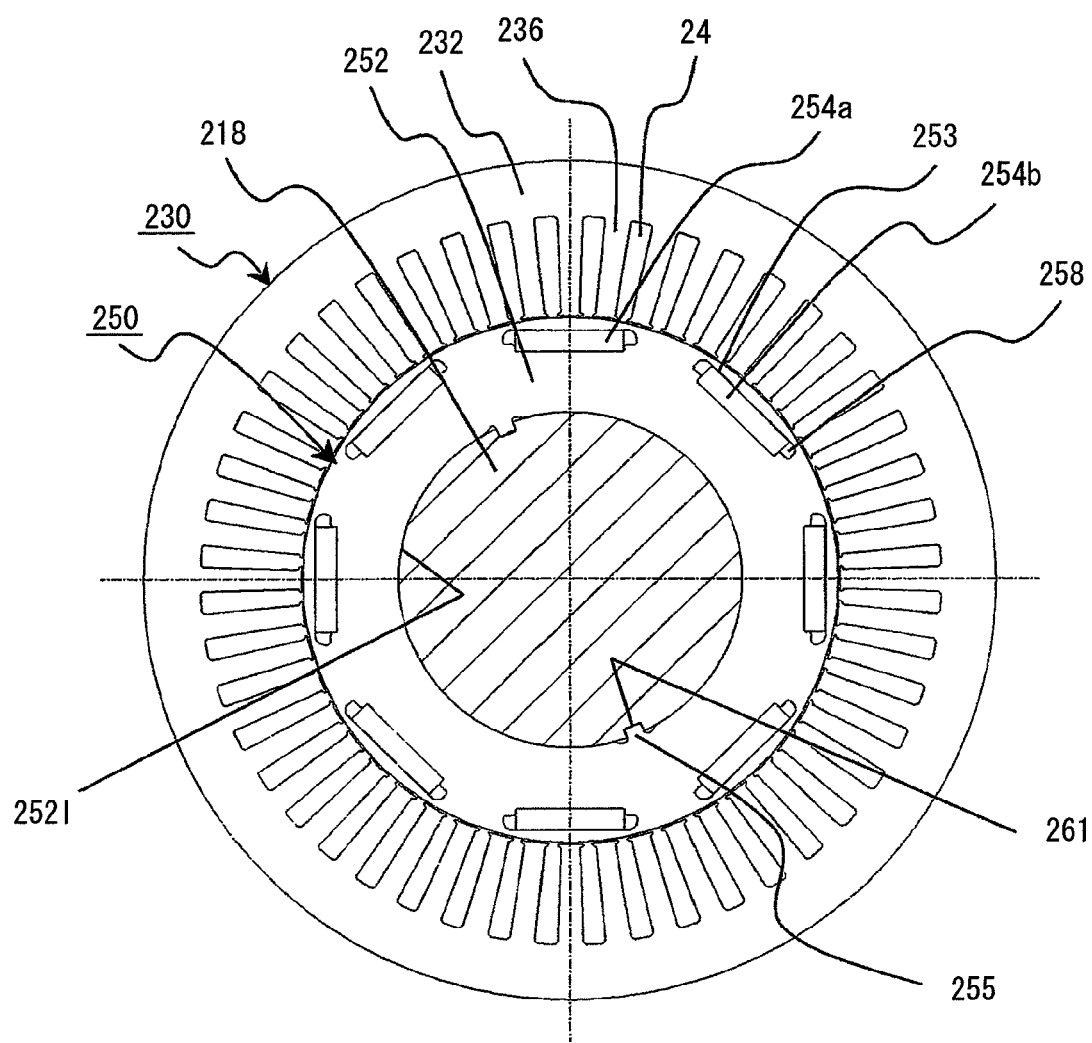
FIG. 4 A sectional view of the stator and the rotor in FIG. 3

FIG. 4 is a sectional view taken through A-A in FIG. 3. FIG. 4 does not include an illustration of the housing 212, or the stator winding 238. FIG. 4 shows that numerous slots 24 and teeth 236 are formed in a uniform pattern along the entire inner circumference of the stator core 232. Inside the slots 24, a slot insulator (not shown) is disposed and a plurality of phase windings corresponding to a U-phase, a V-phase and a W-phase, constituting the stator winding 238, are installed in the slots 24. The stator winding 238 in the embodiment is wound by adopting a distributed winding method. It is to be noted that reference numerals are appended to only one representative slot and an adjacent tooth in FIG. 4.

In the distributed winding method, the phase windings are wound at the stator core 232 so that each phase winding is housed in two slots set apart from each other with a plurality of slots 24 present between them. The magnetic flux distribution achieved in conjunction with the distributed winding system adopted in the embodiment closely approximates a sine wave form. This means that reluctance torque can be generated readily in the embodiment. Thus, optimal control is enabled over a wide rotation rate range, from a low rotation speed through a high rotation speed, through weak-field control and utilization of the reluctance torque, which, in turn, allows optimal motor characteristics for an electric vehicle or the like to be achieved.

Rectangular holes 253 at which permanent magnets 254a and 254b (hereafter collectively notated with the reference number 254) are formed at the rotor core 252. The holes 253 are formed so as to achieve a greater width, measured along the circumferential direction, compared to the width of the permanent magnets 254 measured along the circumferential direction and thus, magnetic gaps 258 are formed on the two sides of each permanent magnet 254. These magnetic gaps 258 may be filled with an adhesive or they may be sealed together with the permanent magnets 254 by using a forming resin. The permanent magnets 254 function as field poles of the rotor 250.

The permanent magnets 254 are magnetized along the radial direction, and the magnetizing direction is reversed from one field pole to the next. Namely, assuming that the surface of a permanent magnet 254a facing toward the stator and the surface of the permanent magnet 254a located on the axial side respectively achieve n-pole and s-pole, the stator-side surface and the axial-side surface of a permanent magnet 254b disposed next to the permanent magnet 254a respectively achieve s-pole and n-pole. Such permanent magnets 254a and 254b are disposed in an alternate pattern along the circumferential direction. In the embodiment, eight permanent magnets 254 are disposed over equal intervals and thus, eight poles are formed at the rotor 250.

Keys 255 are formed so as to project out from the inner circumferential surface of the rotor core 252 over predetermined intervals. At the outer circumferential surface of the shaft 218, recesses to be used as keyways 261 are formed. The keys 255 are clearance-fitted in the keyways 261 so as to transmit rotational torque from the rotor 250 to the shaft 218.

The permanent magnets 254 may first be magnetized and then embedded in the rotor core 252, or they may be inserted at the rotor core 252 in an unmagnetized state and then magnetized by applying an intense magnetic field to the inserted permanent magnets. Once magnetized, the permanent magnets 254 exert a strong magnetic force. This means that if the permanent magnets 254 are polarized before they are fitted at the rotor 250, the strong attracting force occurring between the permanent magnets 254 and the rotor core 252 is likely to present a hindrance during the permanent magnet installation process. Furthermore, the strong attracting force may cause foreign matter such as iron dust to settle on the permanent magnets 254. For this reason, better rotating electric machine productivity is assured by magnetizing the permanent magnets 254 after they are inserted at the rotor core 252.

The permanent magnets 254 may be neodymium-based sintered magnets, samarium-based sintered magnets, ferrite magnets or neodymium-based bonded magnets. The residual magnetic flux density of the permanent magnets 254 is approximately 0.4 to 1.3 T.

It is to be noted that while an explanation has been herein provided by assuming that the first embodiment is adopted in both rotating electric machines 200 and 202, the structure achieved in the first embodiment may be adopted in only one of the rotating electric machines 200 or 202 with another structure adopted in the other rotating electric machine.

Figure 5:
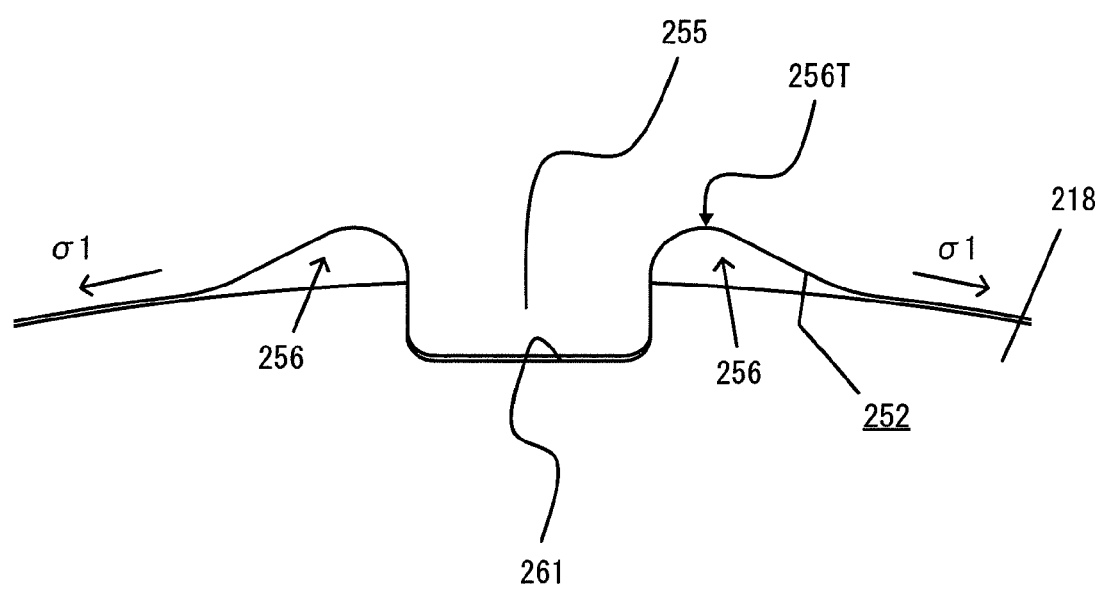
FIG. 5 A sectional view of an area where the key at the rotor core engages with a keyway at the shaft, in an example to be compared with the present invention FIG. 6 A sectional view illustrating how stress concentration may be controlled via a notch FIG. 7 A sectional view illustrating how stress concentration may be controlled via an improved notch FIG. 8 A sectional view illustrating how stress concentration may be controlled via a notch that is further improved FIG. 9 A sectional view of the key at the rotor achieved in the first embodiment of the present invention FIG. 10 A diagram indicating the stress distribution in the key shown in FIG. 9

In FIG. 5, presenting an example of a rotor core to be compared with the rotor core achieved in the embodiment, an area where a key 255 at the rotor core 252 is fitted in a keyway 261 at the shaft 218, i.e., an area where the rotor 250 and the shaft 218 are fastened together, is shown in an enlarged view.

As shown in FIG. 5, a keyway 261 (a recessed portion), ranging along the axial direction, is formed at the outer circumferential surface of the shaft 218. At an inner circumference 252I of the rotor core 252, a key 255 (a projecting portion) with a substantially rectangular section, which projects along a radial direction toward the center, is formed so as to fit into the keyway 261. As side surfaces of the key 255 at the rotor core 252 contact side surfaces of the keyway 261 at the shaft 218, the torque at the rotor 250 is transmitted to the shaft 218. On the two sides of the projecting portion 255, facing opposite each other along the circumferential direction, recessed portions 256 are formed, the openings of which widen radially of the rotor core 252.

As the rotor 250 rotates, centrifugal force is applied to the rotor core 252 along the direction in which the rotor core 252 tends expand outward along the radius thereof, resulting in tensile stress σ1 occurring along the circumferential direction at the rotor core 252. The tensile stress σ1 is distributed over the entire rotor core 252 except for the area where the key 255 projects. At the recessed portions 256 forming notches on the two sides of the key 255, the tensile stress concentrates at their deepest areas 256T.

Under normal circumstances, the extent of stress concentration at the recessed portions 256 may be lessened through either of the following two methods. Namely, the extent of stress concentration may be lessened by increasing the radius of curvature at the recessed portions 256 or by increasing the notch angle at the recessed portions 256.

(General Theory of Stress Concentration)

Figure 6:
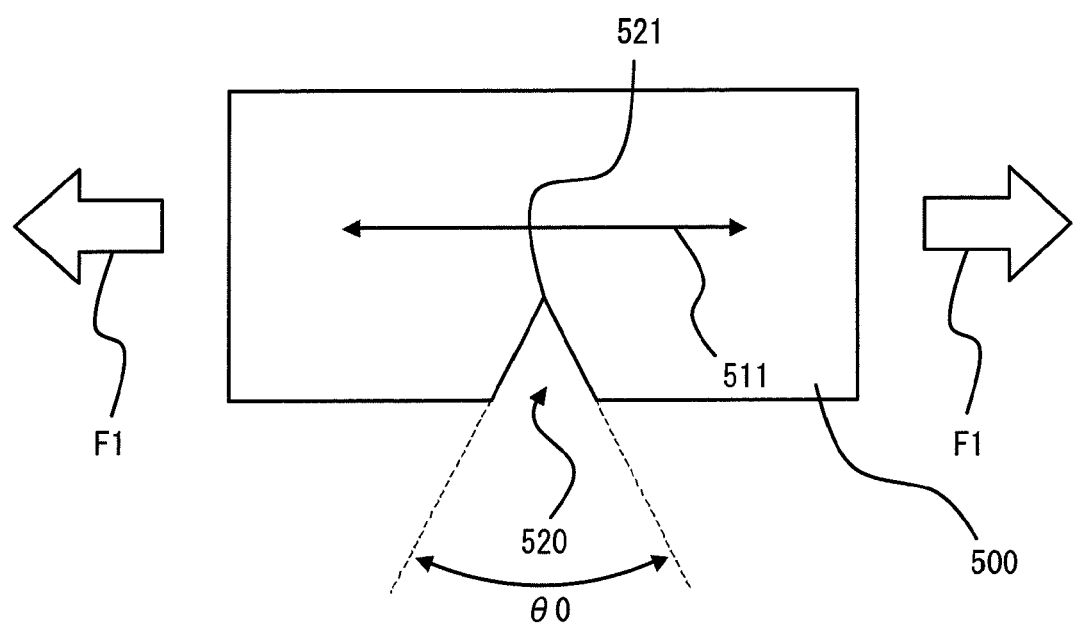
Figure 7:
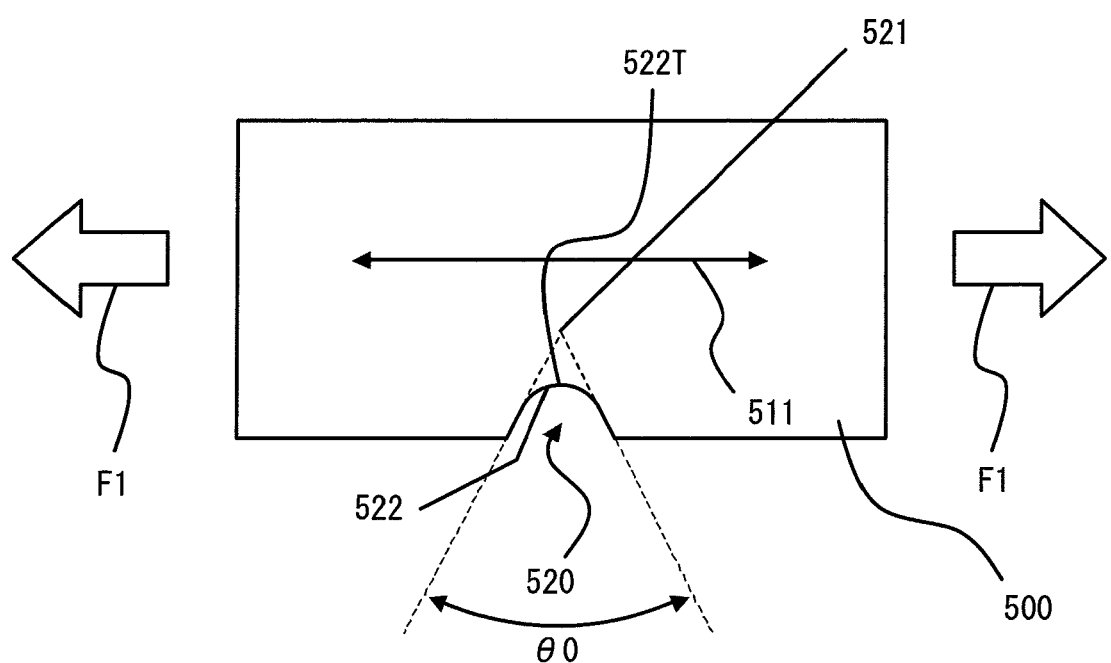
Figure 8:
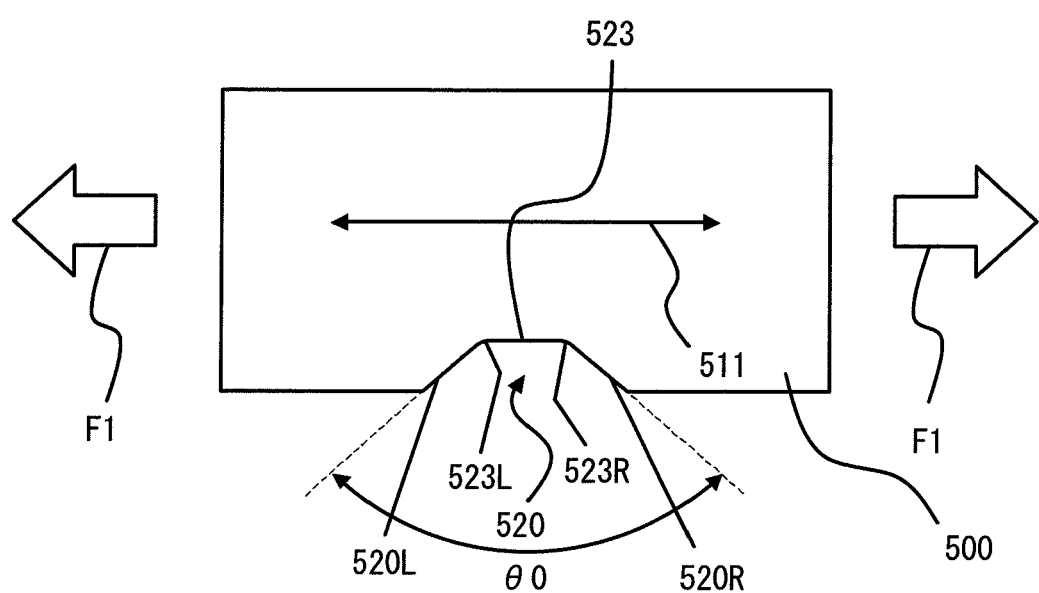

FIGS. 6 through 8, each illustrating how stress concentration occurs in a simple model, are used to demonstrate the concept of stress concentration reduction adopted in the embodiment.

In the model illustrated in FIG. 6 provided as an example of high stress concentration, an extremely high level of stress concentration occurs at an isosceles triangle notch (recessed portion) 520 with a vertex angle θ0 (approximately 60°) formed at a flat plate 500. As a tensile force F1 is applied to the flat plate 500, stress σ1 occurs in the flat plate 500, resulting in concentration of stress at a sharp corner 521 located at the deepest point of the notch 520.

In the model illustrated in FIG. 7, a circular arc portion 522 is formed at an end 521 of the notch 520, which is otherwise similar to the notch 520 in FIG. 6. While tensile stress will concentrate in the circular arc portion 522, the extent of stress concentration can be lessened by increasing the radius of the circular arc portion 522. However, since the end of a recessed portion 520 forms a circular arc, the tensile stress will concentrate at a single point 522T located at the deepest end of the circular arc 522.

In the model illustrated in FIG. 8, the angle θ0 at the notch 520 is widened, a flat surface 523 ranging parallel to the tensile force F1 is formed at the deepest end of the notch 520, and circular arcs are formed at the connecting areas (referred to as a first corner and a second corner) 523L and 523R where the two ends of the flat surface 523 connect with left and right side surfaces 520L and 520R of the notch 520. In this case, the extent of stress concentration is greatly reduced. Explicitly, no stress concentration occurs at the flat surface 523 with a contour parallel to the tensile stress σ1.

It is to be noted that while stress concentration does occur in the first corner 523L and in the second corner 523R, the tensile stress σ1 is dispersed to the two corners 523L and 523R. This dispersal of the tensile stress σ1, combined with a greater angle θ0, makes it possible to lessen the extent of stress concentration over the model illustrated in FIG. 7.

(Notch Shape Achieved in the First Embodiment)

In the embodiment, the stress occurring in the vicinity of each key at the rotor is lessened based upon the findings described in reference to FIGS. 5 through 8. Namely, the recessed portions 256, located on the two sides of each key 255, are formed as described below.

Figure 9:
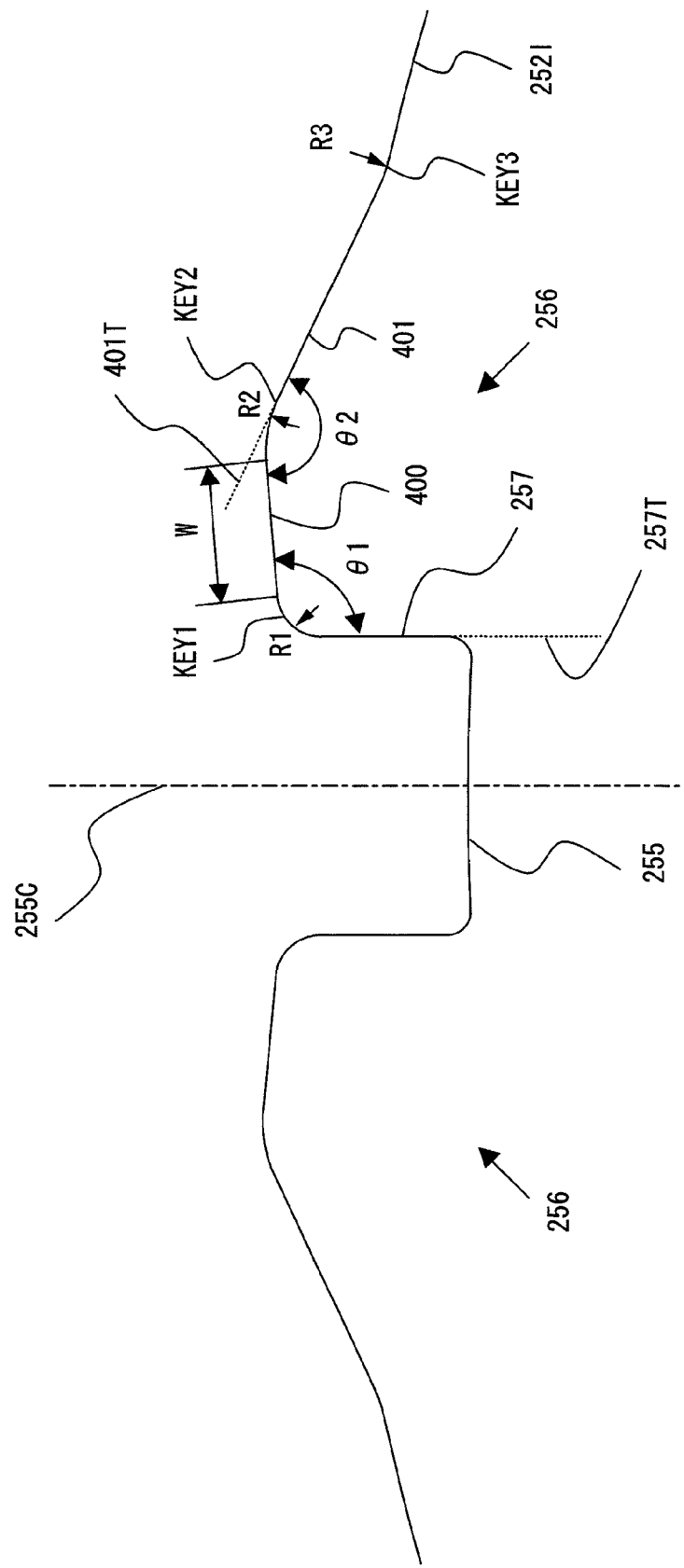

FIG. 9 shows the recessed portions 256. The recessed portions 256 are stress-reducing recesses formed on the two sides of the key 255. The recessed portions 256 are each formed by a side surface 257 of the key 255, a straight contoured portion 400 (ranging over a length W) with a flat contour (hereafter simply referred to as a planar portion), formed at the bottom of the recessed portions 256, a connecting side surface 401 ranging from the inner circumference 252I of the rotor core 252 toward the planar portion 400, a first corner portion key1 assuming the shape of a circular arc (having a radius R1), which connects the key side surface 257 with the planar portion 400, a second corner portion key2 assuming the shape of a circular arc (having a radius R2), which connects the planar portion 400 with the connecting side surface 401, and a bend portion key3 assuming the shape of a circular arc (having a radius R3) connecting the connecting side surface 401 with the inner circumference 252I.

It is to be noted that the planar portion 400 at the rotor achieved in the first embodiment extends over the length W along the direction perpendicular to a central line 255C running through the center of the key 255. It is also to be noted that θ1 may be otherwise defined as an angle of intersection with which the direction along which the key 255 projects intersects the planar portion 400. As will be described in detail later, the angle θ1 can be selected based upon the model illustrated in FIG. 8. It is desirable to set θ1 to, for instance, a value equal to or greater than 85° and less than 120°.

It is to be noted that a smaller angle θ1 will be assumed at the stress-reducing recessed portions 256 of a rotor 250 with a smaller outer diameter. In addition, while the upper limit to the angle θ1 is dependent upon the outer diameter of the rotor 250, the length W required for the planar portion 400 and θ2, the upper limit 120° mentioned earlier is a value calculated in conjunction with a rotor 250 with its outer diameter set in a range of 100 mm through 200 mm.

At the recessed portions 256, the planar portion 400 disallows any concentration of stress at the bottom, stress is distributed to the first corner portion key1 and the second corner portion key2 and the extent of stress concentration in the first corner portion key1 and the second corner portion key2 is limited by forming both the first corner portion key1 and the second corner portion key2 in a circular arc shape. It is to be noted that no stress concentration occurs at the bend portion key3.

Furthermore, by assuming sufficiently large values for θ1, representing the angle formed by the key side surface 257 and the planner portion 400, and θ2, representing the angle formed with a tangential line 401T extending from the connecting side surface 401 through the second corner portion key2, e.g., θ1=90° and θ2=150°, the extent of stress concentration in the first corner portion key1 and the second corner portion key2 is further reduced.

In this instance, θ1 is smaller than θ2 and therefore, the second corner portion key2 achieving the greater angle θ2 is positioned further outward along the radial direction instead of allowing the tangential line 401T at the recessed portions 256 to run parallel to the tensile stress σ1 occurring along the circumferential direction. Since this allows a greater angle to be assumed for θ1, the level of stress in the first corner portion key1 can be reduced, compared to the level of stress in the first corner portion key1 that would manifest with the tangential line 401T at the recessed portions 256 running parallel to the tensile stress σ1 occurring along the circumferential direction.

Figure 10:
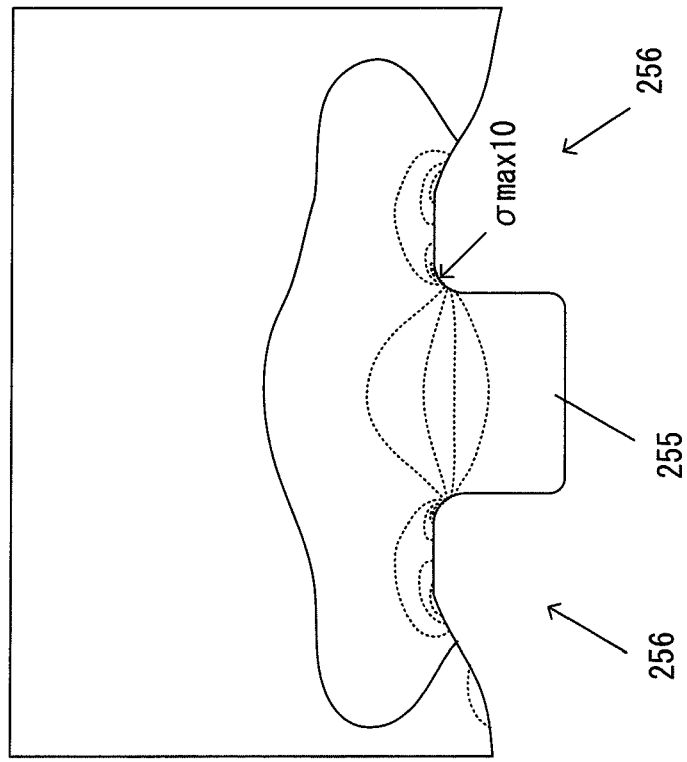
Figure 11:
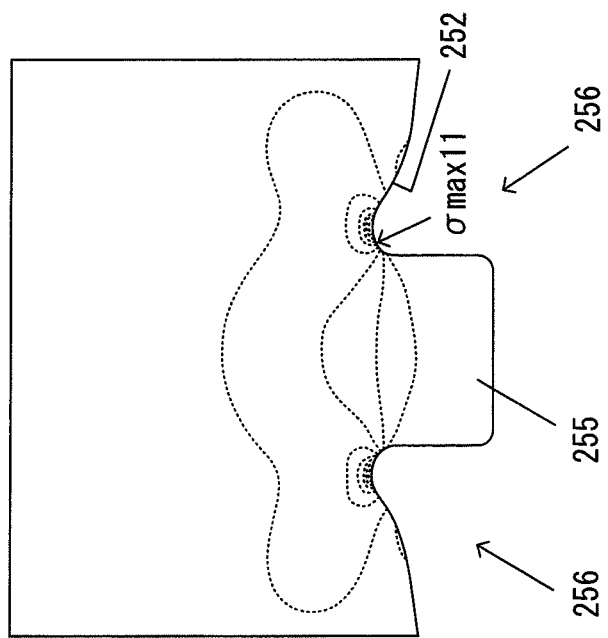
FIG. 11 A diagram indicating the stress distribution in the key shown in FIG. 5

As the stress distribution diagram in FIG. 10 indicates, the first corner portion key1 and the second corner portion key2 are subjected to substantially equal maximum stresses σmax10 at the recessed portions 256 achieved in the first embodiment, as shown in FIG. 9, when θ1=93°, R1=1 mm, W=2 mm, θ2=150° and R2=3 mm. In the comparison example presented in FIG. 5, a maximum stress σmax11 occurs at the deepest end 256T of the recessed portions 256, as indicated in the stress distribution diagram presented in FIG. 11, σmax10 amounts to only 70% of σmax11.

Namely, the maximum stress occurring at the recessed portions 256 of the rotor 250 achieved in the first embodiment is reduced to approximately 70% of that occurring at the recessed portion of the rotor in the comparison example. In addition, the stress distribution diagrams in FIGS. 10 and 11 clearly indicate that the extent of stress concentration is effectively lessened through the first embodiment, as the stress is dispersed over a wider range in FIG. 10 compared to the stress distribution indicated in FIG. 11.

In particular, since the stress is equally distributed to the first corner portion key1 and the second corner portion key2 and stress is further distributed along the straight contoured portion 400, as shown in FIG. 10, optimal stress management can be achieved over the entire key in the embodiment, thereby assuring an improvement over the key in the rotating electric machine disclosed in patent literature 2.

(Effect Achieved at the Planar Portion)

FIGS. 12 through 15 each present a graph indicating changes occurring in the stress in the first corner portion key1 and the second corner portion key2 under high speed rotation conditions, as the length W of the planar portion 400, starting at 0 mm, is gradually increased. Each figure indicates changes occurring in the stress in the first corner portion key1 and the second corner portion key2 as W changes as percentages relative to the stress level in the key base shown in FIGS. 5 and 11 set at 100%.

Figure 12:
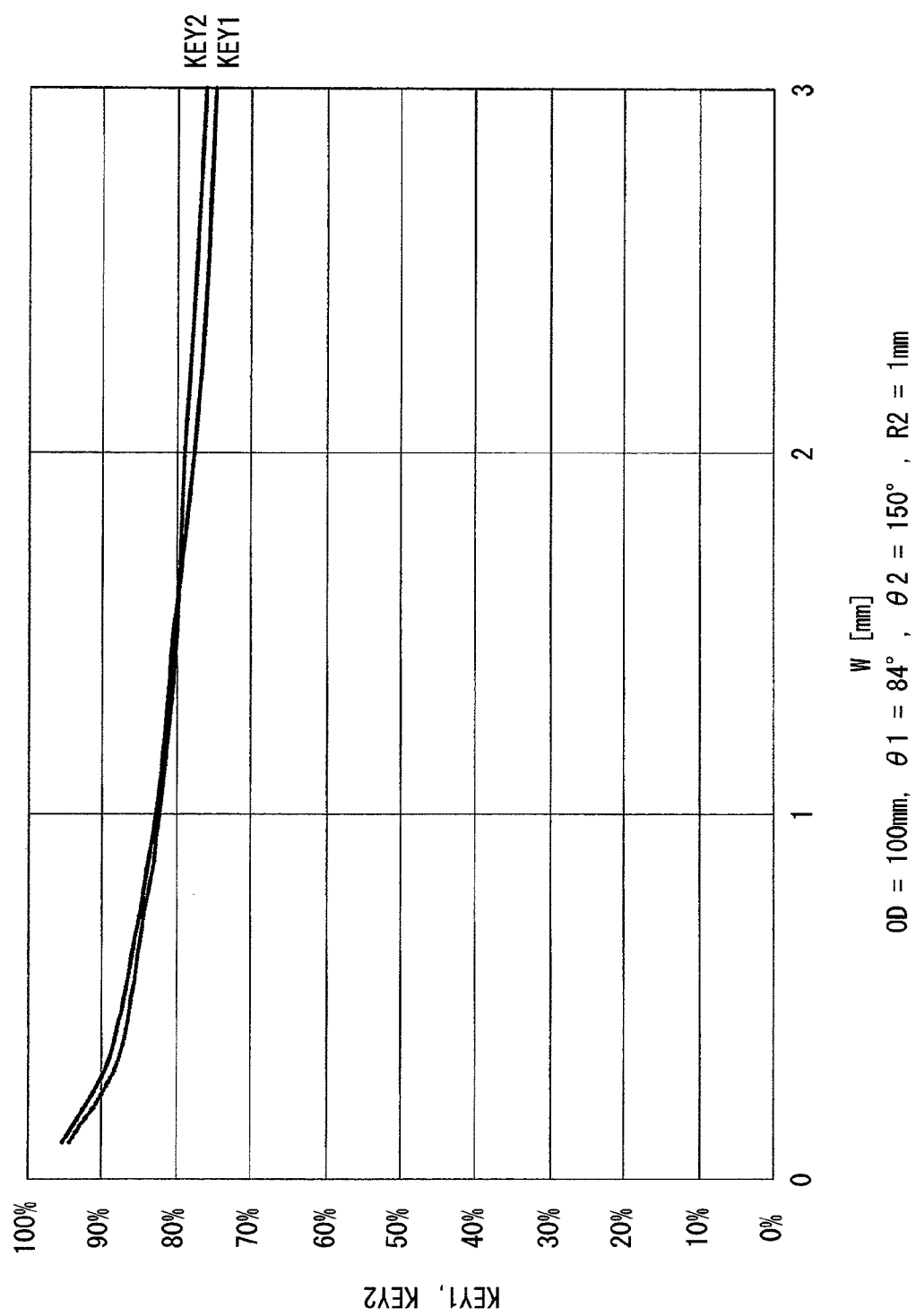
FIG. 12 A graph indicating characteristics of changes occurring in the stress at the first corner portion and the second corner portion as the length W of the planar portion changes in the key shown in FIG. 9

FIG. 12 indicates the changes occurring in the stress, graphed for a rotor 250 with the following dimensions; outer diameter OD=100 mm, radius R1 of the first corner portion key 1=1 mm, radius R2 of the second corner portion key2=1 mm, θ1=84° and θ2=150°.

Figure 13:
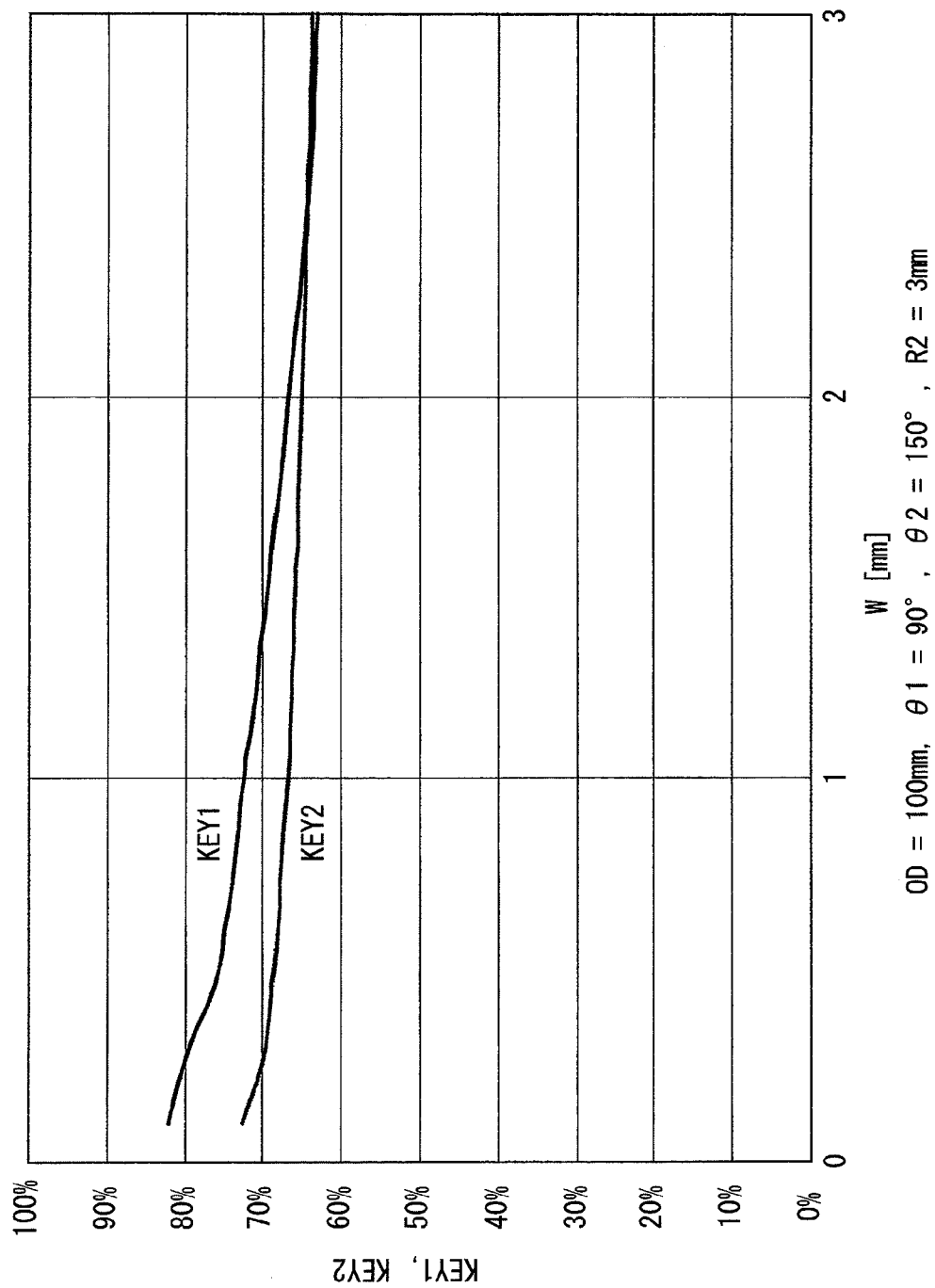
FIG. 13 A graph indicating characteristics of changes occurring in the stress at the first corner portion and the second corner portion as the length W of the planar portion changes in the key shown in FIG. 9

FIG. 13 indicates the changes occurring in the stress, graphed for a rotor 250 with the following dimensions; outer diameter OD=100 mm, radius R1 of the first corner portion key1=1 mm, radius R2 of the second corner portion key2=3 mm, θ1=90° and θ2=150°.

Figure 14:
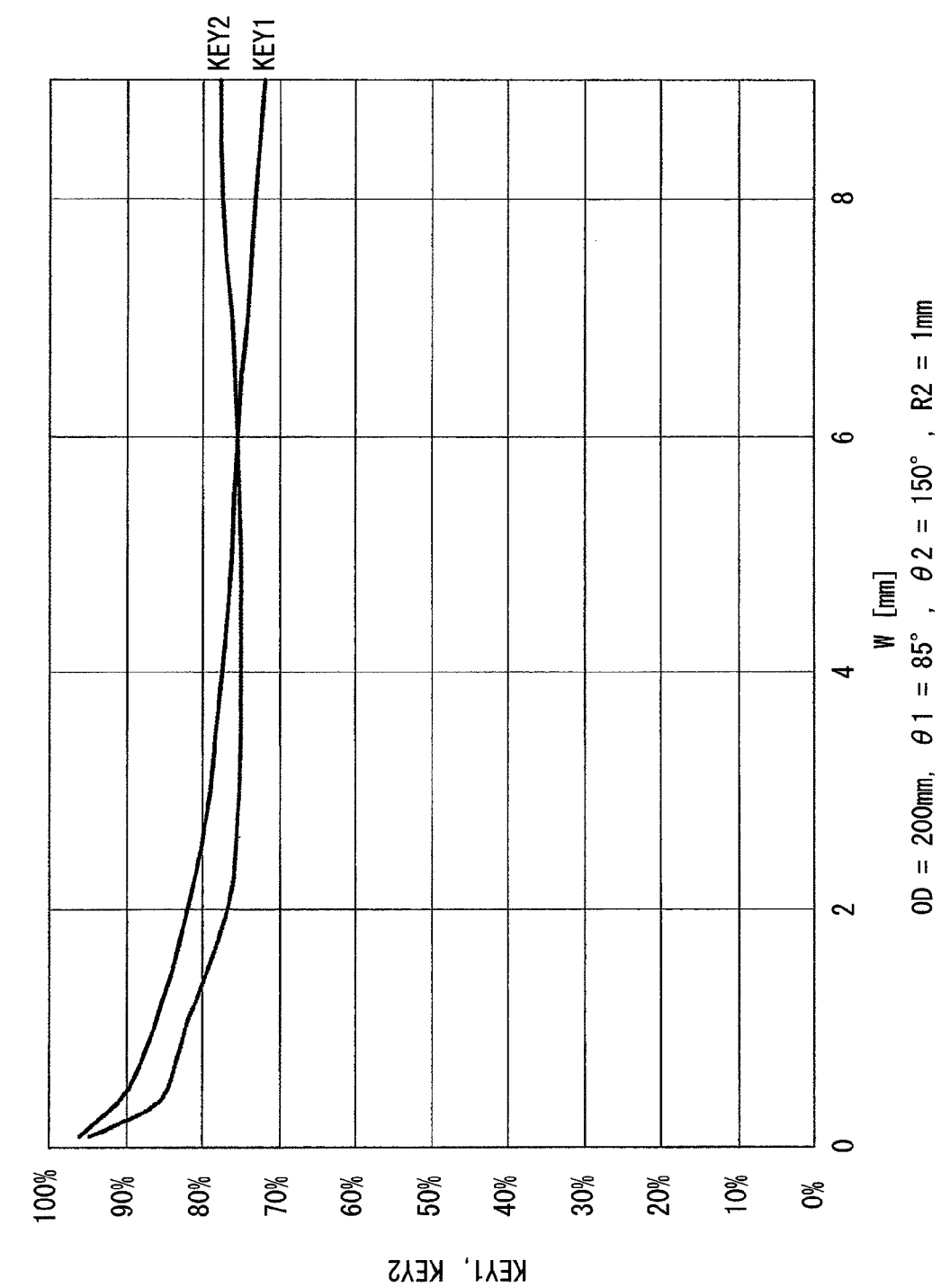
FIG. 14 A graph indicating characteristics of changes occurring in the stress at the first corner portion and the second corner portion as the length W of the planar portion changes in the key shown in FIG. 9

FIG. 14 indicates the changes occurring in the stress, graphed for a rotor 250 with the following dimensions; outer diameter OD=200 mm, radius R1 of the first corner portion key1=1 mm, radius R2 of the second corner portion key2=1 mm, θ1=85° and θ2=150°.

Figure 15:
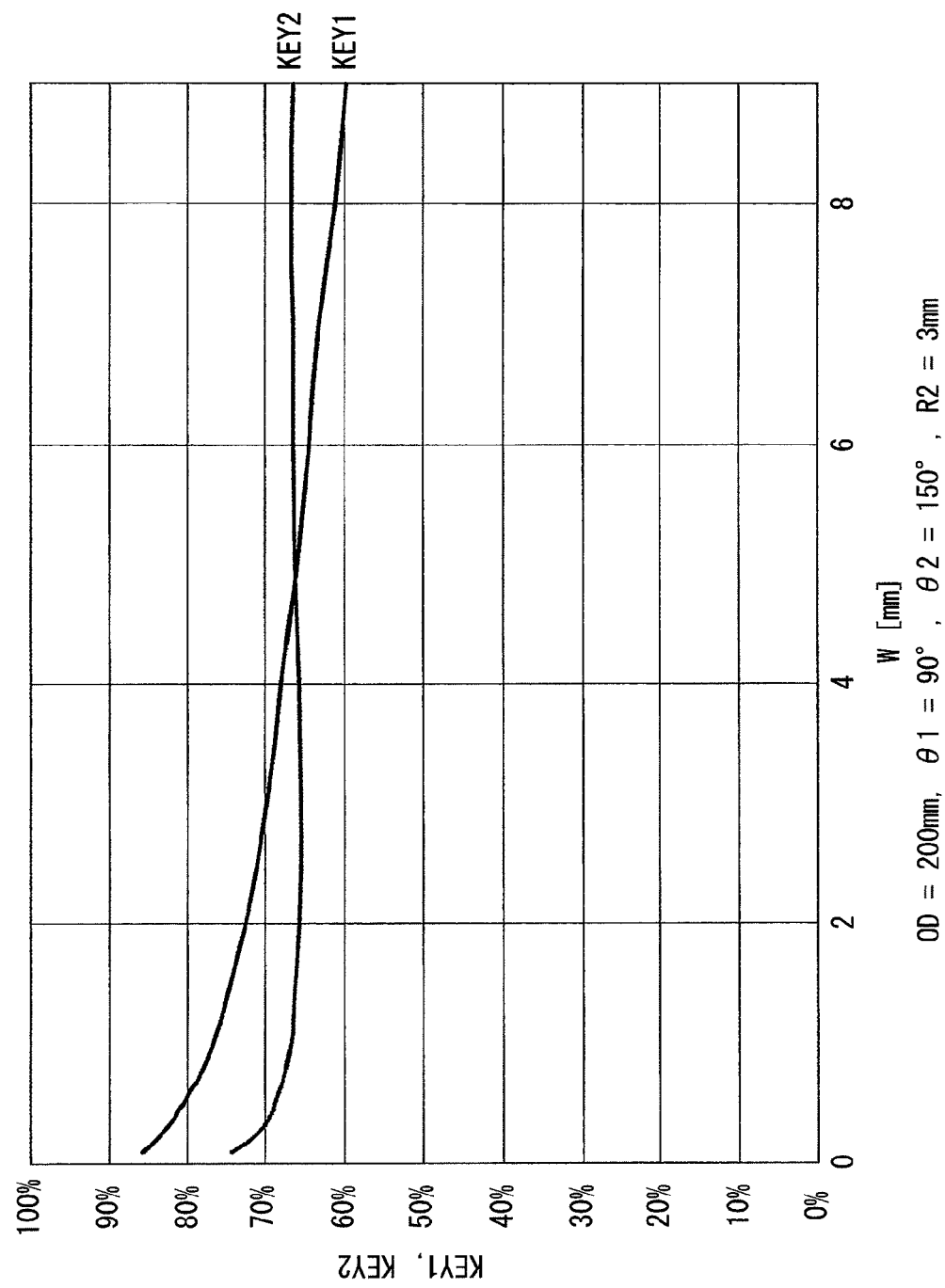
FIG. 15 A graph indicating characteristics of changes occurring in the stress at the first corner portion and the second corner portion as the length W of the planar portion changes in the key shown in FIG. 9

FIG. 15 indicates the changes occurring in the stress, graphed for a rotor 250 with the following dimensions; outer diameter OD=200 mm, radius R1 of the first corner portion key1=1 mm, radius R2 of the second corner portion key2=3 mm, θ1=90° and θ2=150°.

The diagrams all indicate a tendency whereby the stress level in the second corner portion key2 remains less than the stress level in the first corner portion key1 until W becomes equal to a predetermined value, the stress levels in the first and second corner portions key1 and key2 become equal to each other when the planar portion assumes the predetermined reference length W, and the stress level in the second corner portion key2 exceeds the stress level in the first corner portion key1 once W exceeds the predetermined reference length. By selecting specific dimensions for the various parts of the rotor 250, the stress level in the first corner portion key1 and the stress level in the second corner portion key2 can be equalized.

(Effect Achieved by Selecting an Optimal Value for θ1)

FIGS. 16 through 19 each present a graph indicating changes occurring in the stress in the first corner portion key1 and the second corner portion key2 under high speed rotation condition, as θ1 changes at a rotor with its planar portion 400 assuming a length W of 2 mm and θ2 set at 150°. Each figure indicates changes occurring in the stress in the first corner portion key1 and the second corner portion key2 as θ1 changes as percentages relative to the stress level in the key base shown in FIGS. 5 and 11 set at 100%.

Figure 16:
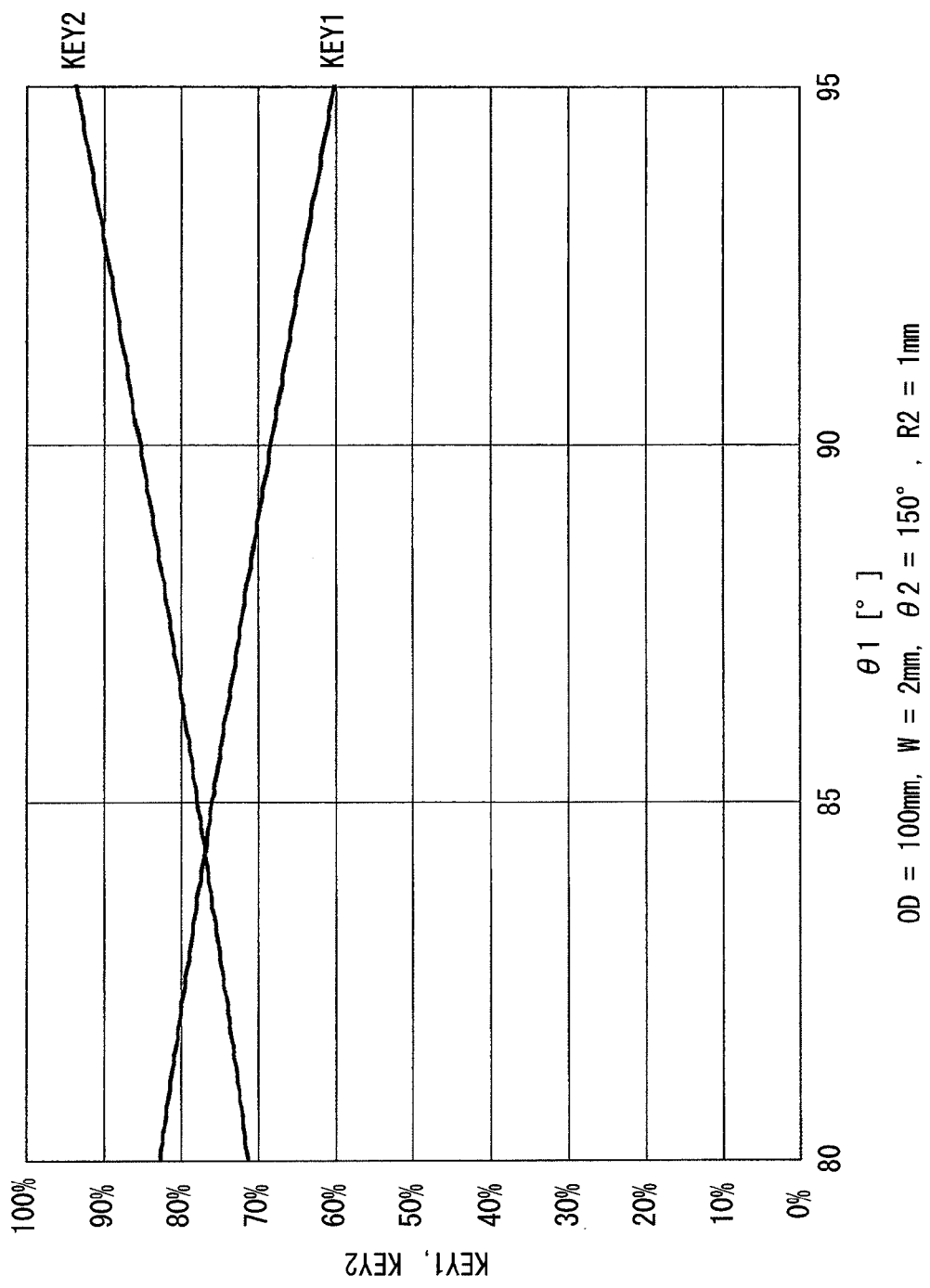
FIG. 16 A graph indicating characteristics of changes occurring in the stress at the first corner portion and the second corner portion as the angle θ1 of the first corner portion changes in the key shown in FIG. 9

FIG. 16 indicates the changes occurring in the stress, graphed for a rotor 250 with the following dimensions; outer diameter OD=100 mm, radius R1 of the first corner portion key1=1 mm and radius R2 of the second corner portion key2=1 mm. The changes occurring in the stress are graphed by increasing θ1 from 80°

Figure 17:
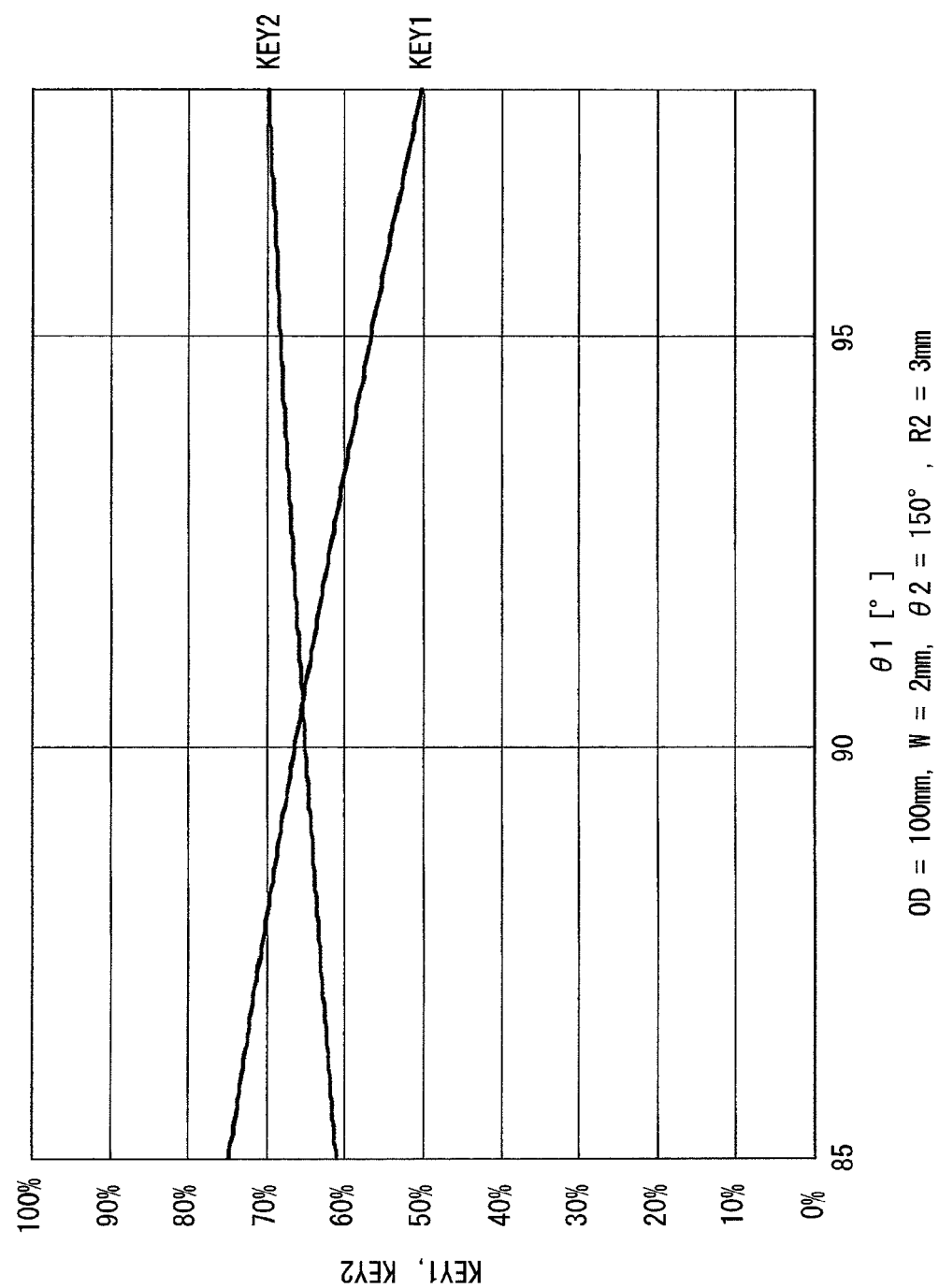
FIG. 17 A graph indicating characteristics of changes occurring in the stress at the first corner portion and the second corner portion as the angle θ1 of the first corner portion changes in the key shown in FIG. 9

FIG. 17 indicates the changes occurring in the stress, graphed for a rotor 250 with the following dimensions; outer diameter OD=100 mm, radius R1 of the first corner portion key1=1 mm and radius R2 of the second corner portion key2=3 mm. The changes occurring in the stress are graphed by increasing θ1 from 85°

Figure 18:
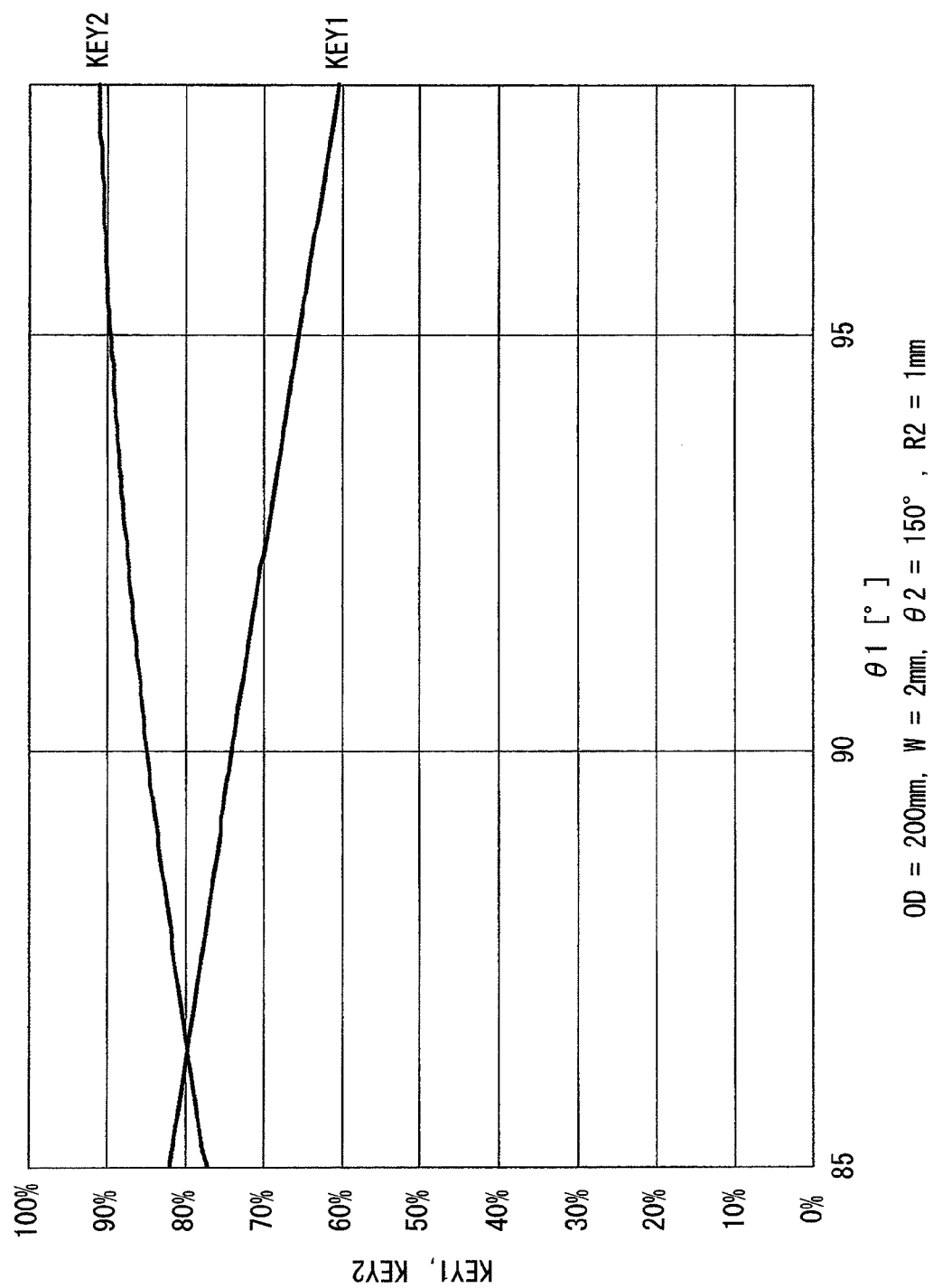
FIG. 18 A graph indicating characteristics of changes occurring in the stress at the first corner portion and the second corner portion as the angle θ1 of the first corner portion changes in the key shown in FIG. 9

FIG. 18 indicates the changes occurring in the stress, graphed for a rotor 250 with the following dimensions; outer diameter OD=200 mm, radius R1 of the first corner portion key1=1 mm and radius R2 of the second corner portion key2=1 mm. The changes occurring in the stress are graphed by increasing θ1 from 85°

Figure 19:
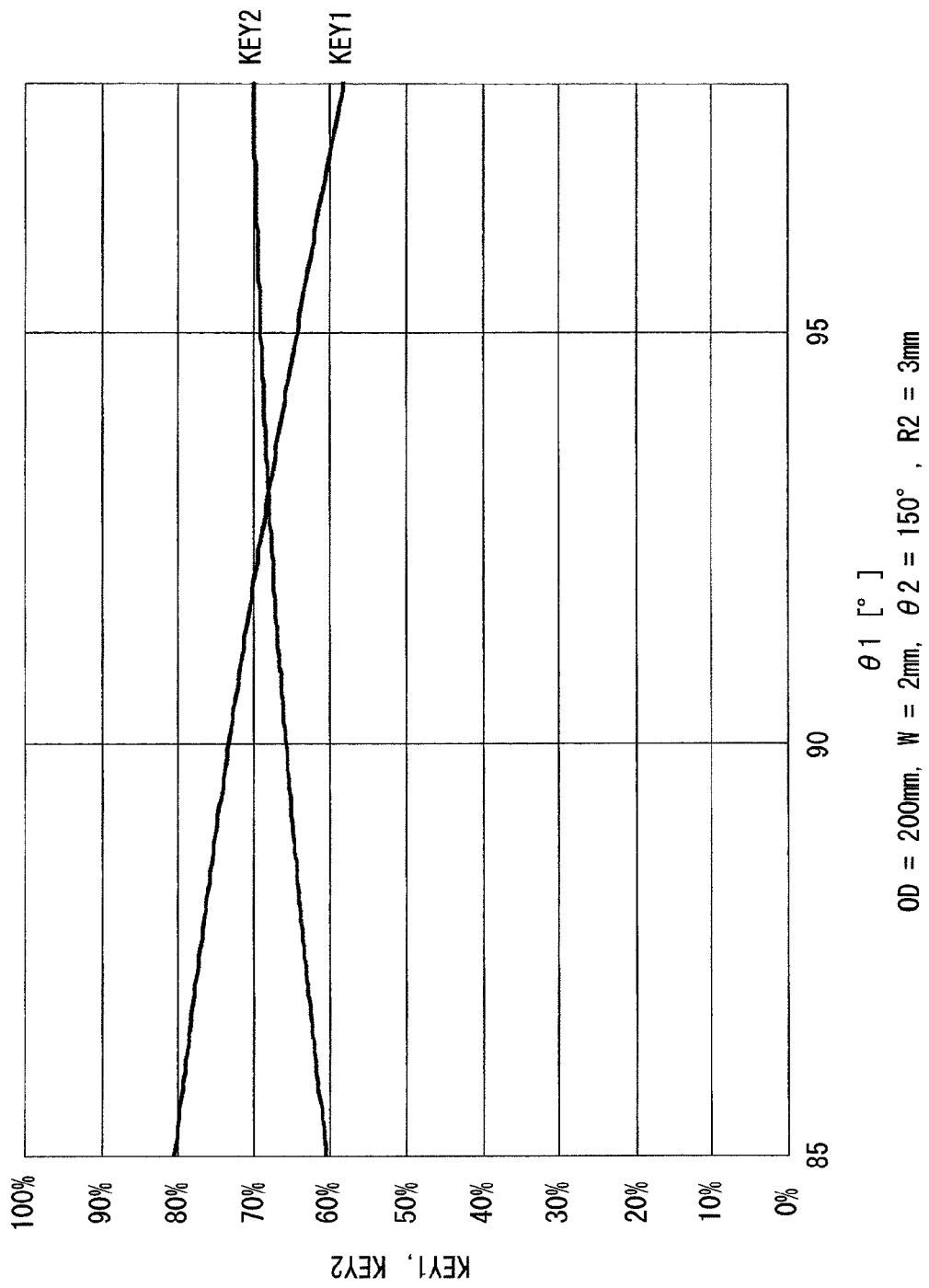
FIG. 19 A graph indicating characteristics of changes occurring in the stress at the first corner portion and the second corner portion as the angle θ1 of the first corner portion changes in the key shown in FIG. 9

FIG. 19 indicates the changes occurring in the stress, graphed for a rotor 250 with the following dimensions; outer diameter OD=200 mm, radius R1 of the first corner portion key1=1 mm and radius R2 of the second corner portion key2=3 mm. The changes occurring in the stress are graphed by increasing θ1 from 85°

The changes graphed in FIGS. 16 and 17 in conjunction with rotors 250 with the outer diameters OD thereof both set to 100 mm indicate a tendency whereby the stress level in the second corner portion key2 remains less than the stress level in the first corner portion key1 until θ1 becomes equal to a predetermined reference angle, the stress levels in the first and second corner portions key1 and key2 become equal to each other when θ1 is the predetermined reference angle, and the stress level in the second corner portion key2 exceeds the stress level in the first corner portion key1 once θ1 exceeds the predetermined reference angle. By selecting specific dimensions for the various parts of the rotor 250, the stress level in the first corner portion key1 and the stress level in the second corner portion key2 can be equalized.

The changes graphed in FIGS. 18 and 19 in conjunction with rotors 250 with the outer diameters OD thereof both set to 200 mm indicate a tendency whereby the stress level in the second corner portion key2 remains greater than the stress level in the first corner portion key1 until θ1 becomes equal to a predetermined reference angle, the stress levels in the first and second corner portions key1 and key2 become equal to each other when θ1 is the predetermined reference angle, and the stress level in the second corner portion key2 exceeds the stress level in the first corner portion key1 once θ1 exceeds the predetermined reference angle. By selecting specific dimensions for the various parts of the rotor 250, the stress level in the first corner portion key1 and the stress level in the second corner portion key2 can be equalized.

(Effect Achieved by Selecting an Optimal Value for θ2)

Figure 20:
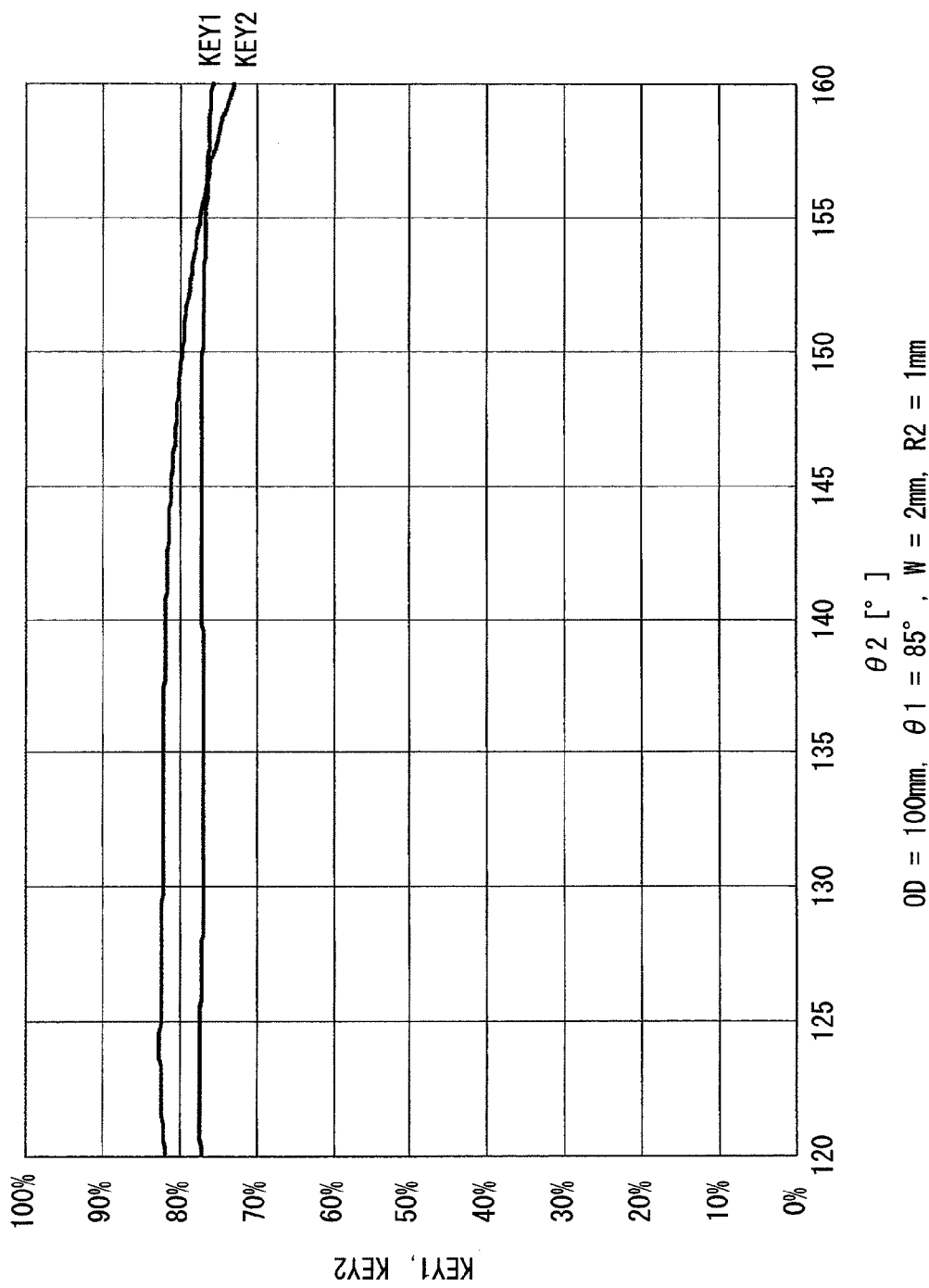
FIG. 20 A graph indicating characteristics of changes occurring in the stress at the first corner portion and the second corner portion as the angle θ2 of the second corner portion changes in the key shown in FIG. 9
Figure 21:
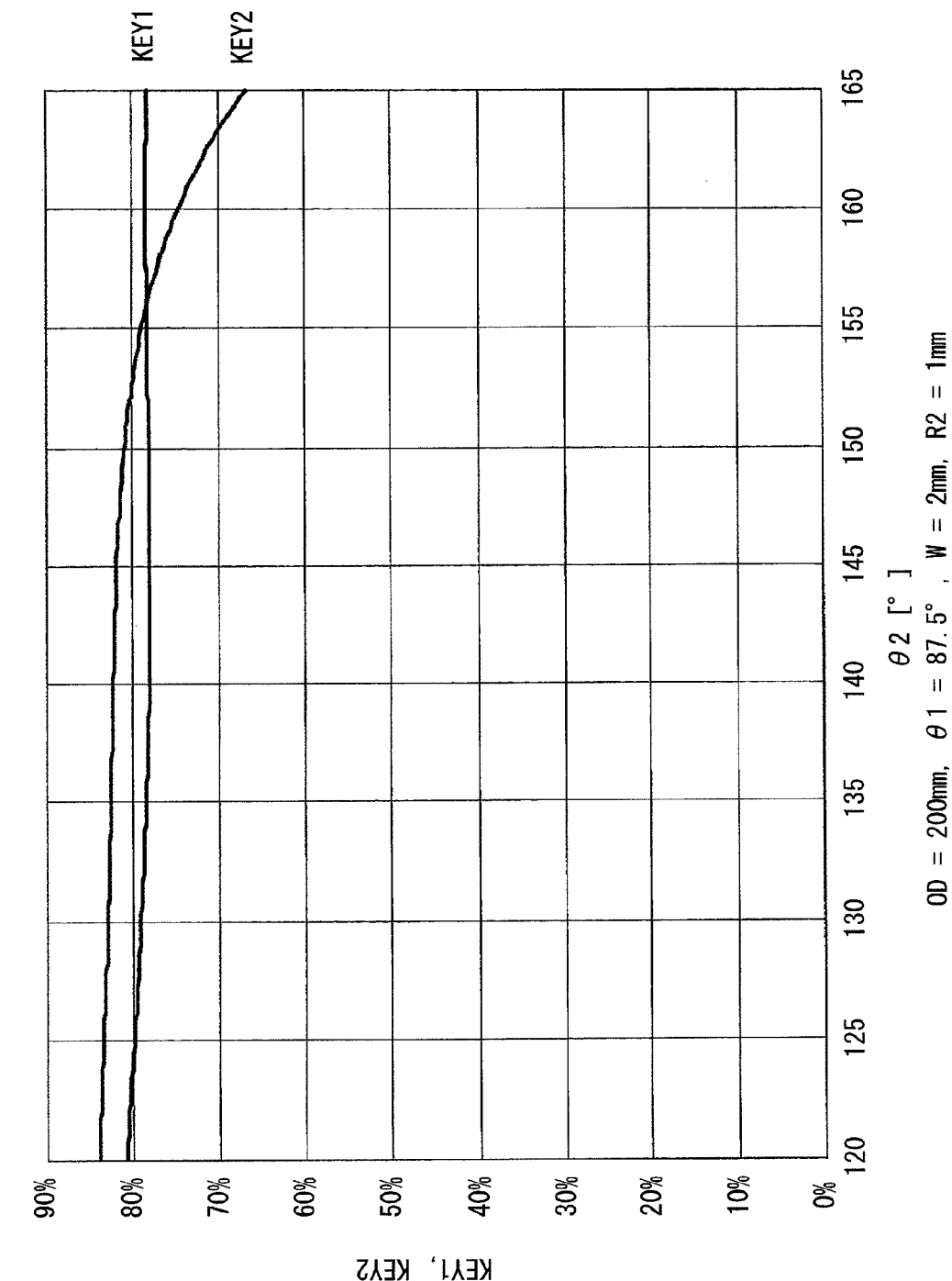
FIG. 21 A graph indicating characteristics of changes occurring in the stress at the first corner portion and the second corner portion as the angle θ2 of the second corner portion changes in the key shown in FIG. 9

FIGS. 20 and 21 each present a graph indicating changes occurring in the stress in the first corner portion key1 and the second corner portion key2 under high speed rotation conditions, as θ2 changes at a rotor with its planar portion 400 assuming a length W of 2 mm. Each figure indicates changes occurring in the stress in the first corner portion key1 and the second corner portion key2 as θ2 changes as percentages relative to the stress level in the key base shown in FIGS. 5 and 11 set at 100%.

FIG. 20 indicates the changes occurring in the stress, graphed for a rotor 250 with the following dimensions; outer diameter OD=100 mm, radius R1 of the first corner portion key1=1 mm, radius R2 of the second corner portion key2=1 mm and θ1=85°. The changes occurring in the stress are graphed by increasing θ2 from 120°

FIG. 21 indicates the changes occurring in the stress, graphed for a rotor 250 with the following dimensions; outer diameter OD=200 mm, radius R1 of the first corner portion key1=1 mm, radius R2 of the second corner portion key2=1 mm and θ1=87.5°. The changes occurring in the stress are graphed by increasing θ2 from 120°

FIGS. 20 and 21 both indicate a tendency whereby the stress level in the second corner portion key2 is greater than the stress level in the first corner portion key1 until θ2 becomes equal to a predetermined reference angle, the stress levels in the first and second corner portions key1 and key2 become equal to each other when θ2 is the specific reference angle, and the stress level in the second corner portion key2 becomes lower than the stress level in the first corner portion key1 once θ2 exceeds the predetermined reference angle. By selecting specific dimensions for the various parts of the rotor 250, the stress level in the first corner portion key1 and the stress level in the second corner portion key2 can be equalized.

FIGS. 20 and 21 also reveal that the extents of changes in the stress levels resulting from the change in θ2 is not as great as the extents to which the stress levels change as θ1 is altered.

While the connecting side surface 401 in the example presented in FIG. 9 assumes a contour that is substantially straight, the connecting side surface 401 may instead assume any of various curved contours. In conjunction with a curved connecting side surface 401, the angle θ2 should be defined as an angle formed by the tangential line 401T of the circular arc R2 and the direction along which the planar portion 400 ranges, measured at the connecting point at which the connecting side surface 401 connects with the circular arc. An approach substantially similar to that having been theorized above is applicable to such an angle θ2.

While the key 255 is formed as a substantially rectangular section in the example described above, the key 255 may adopt any shape, such as an inverted trapezoid, as long as the shape allows the key 255 to engage with the keyway 261 with a high level of reliability. In conjunction with a key 255 adopting an alternative shape, the angle θ1 should be defined as an angle formed by the tangential line 257T of the circular arc R1 and the planar portion, measured at the connecting point at which the key side surface 257 connects with the circular arc R1. An approach substantially similar to that having been theorized above is applicable to such an angle θ1.

It is to be noted that the angle θ1 may instead be defined in reference to the central line 255C running through the center of the key 255. In other words, the angle θ1 may be defined as the angle formed by the direction along which the key 255 projects out and the direction along which the planner portion 400 ranges. Such a definition allows θ1 to be set independently, regardless of the shape of the key 255.

(Effect Achieved by Selecting an Optimal Value for R2)

Although substantiating data are not provided, it has been learned that the radius of the circular arc R2 does not affect the extent of stress concentration in the first corner portion key1.

As explained earlier, circular arcs R2 and R3 are formed for purposes of stress concentration reduction in the corner portion key2 where the connecting side surface 401 connects with the planar portion 400 and in bend portion key3 where the connecting side surface 401 connects with the inner circumferential surface 252I of the rotor core 252. Since stress occurring near the key 255 adopting the shape described earlier can be dispersed over the circular arc R1, the circular arc R2 and the planar portion 400, a reduction in the extent of stress concentration is achieved.

It is to be noted that while the explanation has been given by assuming that the tensile stress σ1 is caused entirely by the centrifugal force. The tensile stress is also caused by a shearing force imparted as the drive torque is transmitted from the rotor 250 to the shaft 218.

The rotor 250 achieved in the first embodiment as described above includes a rotating shaft 218 with at least one keyway 261 formed at the outer circumferential surface thereof and ranging along the axial direction, and a rotor core 252 that includes a key 255, to be fitted into the keyway 261, which projects out on the inner circumferential side. In addition, recessed portions 256, which become wider further outward along the radius of the rotor core 252, are formed near the key at the rotor core 252. The recessed portions 256 each include, at least, a planar portion 400 formed thereat, and as a result, the stress level on the two sides of the key, facing opposite each other along the circumferential direction, is lessened via the planar portions 400.

In addition, the planar portion 400 at the rotor 250 achieved in the first embodiment, formed so as to achieve a straight contour, extends over a predetermined length W along the direction perpendicular to the direction along which the key 255 projects out. At the end of the straight contoured portion 400 facing opposite the key side, a connecting side surface 401, which extends to the inner circumference 252I of the rotor core 252, is formed continuously to the planar portion 400. The first corner portion key1 connecting the key side surface 257 of the key 255 with the key-side end of the planar portion 400 is formed as a circular arc contoured portion R1, whereas the second corner portion key2 connecting the end of the straight contoured portion 400 facing opposite the key side with the connecting side surface 401 is formed as a circular arc contoured portion R2.

The length W of the planar portion 400 in the rotor 250 achieved in the first embodiment is determined as described below in conjunction with the dimensions and the shape assumed for the rotor 250 as has been described in reference to FIGS. 12 through 16. Namely, the length W of the planar portion 400 is determined so that the level of stress occurring near the key 255, due to the centrifugal force acting on the rotor core 252 as the rotor 250 rotates, never exceeds a predetermined threshold value. In addition, the various conditions pertaining to the dimensions and the shape of the rotor 250 in the rotating electric machine achieved in the first embodiment are determined so as to equalize the stress levels in the first corner portion key1 and the second corner portion key2.

It is to be noted that the length of the planar portion 400 in the first embodiment is determined by further taking into consideration the radius of curvature R1 at the circular arc contoured portion at the first corner portion key1 and the radius of curvature R2 at the circular arc contoured portion at the second corner portion key2.

The rotating electric machine in the first embodiment achieves the following advantages.

(1) By forming recessed portions 256, each of which includes a planar portion 400, in the vicinity of each key 255 at the rotor 250, the level of stress occurring near the key 255 is reduced without complicating the structural design. As a result, the motor is allowed to rotate at higher speed without having to use expensive, high tensile strength steel sheets for the rotor core.

(2) The presence of the circular arc contoured portions R1 and R2 formed at the key-side end of the planar portion and at the end of the planar portion facing opposite the key side makes it possible to disperse the stress occurring at the recessed portions.

(3) As the dimensions and the shape of the rotor 250 are determined so as to substantially equalize the stress levels in the first corner portion key1 and in the second corner portion key2, optimal stress reduction is achieved for the entire key.

For instance, the angle θ1 formed by the key side surface 257 and the straight contoured portion 400 and the angle θ2 formed by the straight contoured portion 400 and the connecting side surface 401 may be determined so as to substantially equalize the stress levels in the first corner portion key1 and in the second corner portion key2.

As an alternative, the length W over which the planar portion extends, the angle θ1 formed by the key side surface 257 and the straight contoured portion 400, the angle θ2 formed by the straight contoured portion 400 and the connecting side surface 401 and the radius of curvature R1 at the first corner portion and the radius of curvature R2 at the second corner portion may be determined so as to substantially equalize the stress levels in the first corner portion key1 and in the second corner portion key2.

(4) By setting the length of the planar portion so as to substantially equalize the stress levels at the key-side end of the planar portion and at the end of the planar portion facing opposite the key side, the strength of the rotor core 252 can be optimized.

(5) As long as θ1 is less than 90°, the size of the openings at the recessed notches 256 will be small. Under such circumstances, the presence of the recessed notches does not significantly affect the magnetic field and thus, the presence of the recessed notches does not adversely affect the rotor performance, e.g., the torque, to a significant extent.

(6) When θ1 is greater than 90°, on the other hand, the key can be machined with better ease and the trimming die does not wear out really.

While the key 255 needs to engage with the keyway 261 over a sufficiently large area, the formation of the recessed portions 256 does not affect the length of the key side surfaces 257. This means that the specifications pertaining to the keyway 261 do not need to be altered and that a shaft 218, conforming to specifications similar to those of the shaft 218 in the comparison example, can be utilized without changes.

The sectional area of the recessed portions 256 is greater than that at the rotor in the comparison example (see FIG. 5) and the depth of the recessed portions, measured toward the outside along the radial direction, is bound to somewhat increase. However, the recessed portions 256 mainly widen along the circumference of the rotor core 252 and thus, the presence of the recessed portions 256 does not adversely affect the strength of the rotor core 252.

The presence of the circular arc R3 formed at the bend portion key3 reduces the extent of stress concentration at the bend portion key3.

By forming the recessed portions 256 at locations where magnetic fluxes tend to be weak, e.g., areas between magnetic poles, the extent to which the presence of the recessed portions 256 affects the magnetic flux can be minimized. This means that as long as the recessed portions 256 are formed at optimal positions, their presence does not compromise the performance of the rotating electric machine.

Second Embodiment

Figure 22:
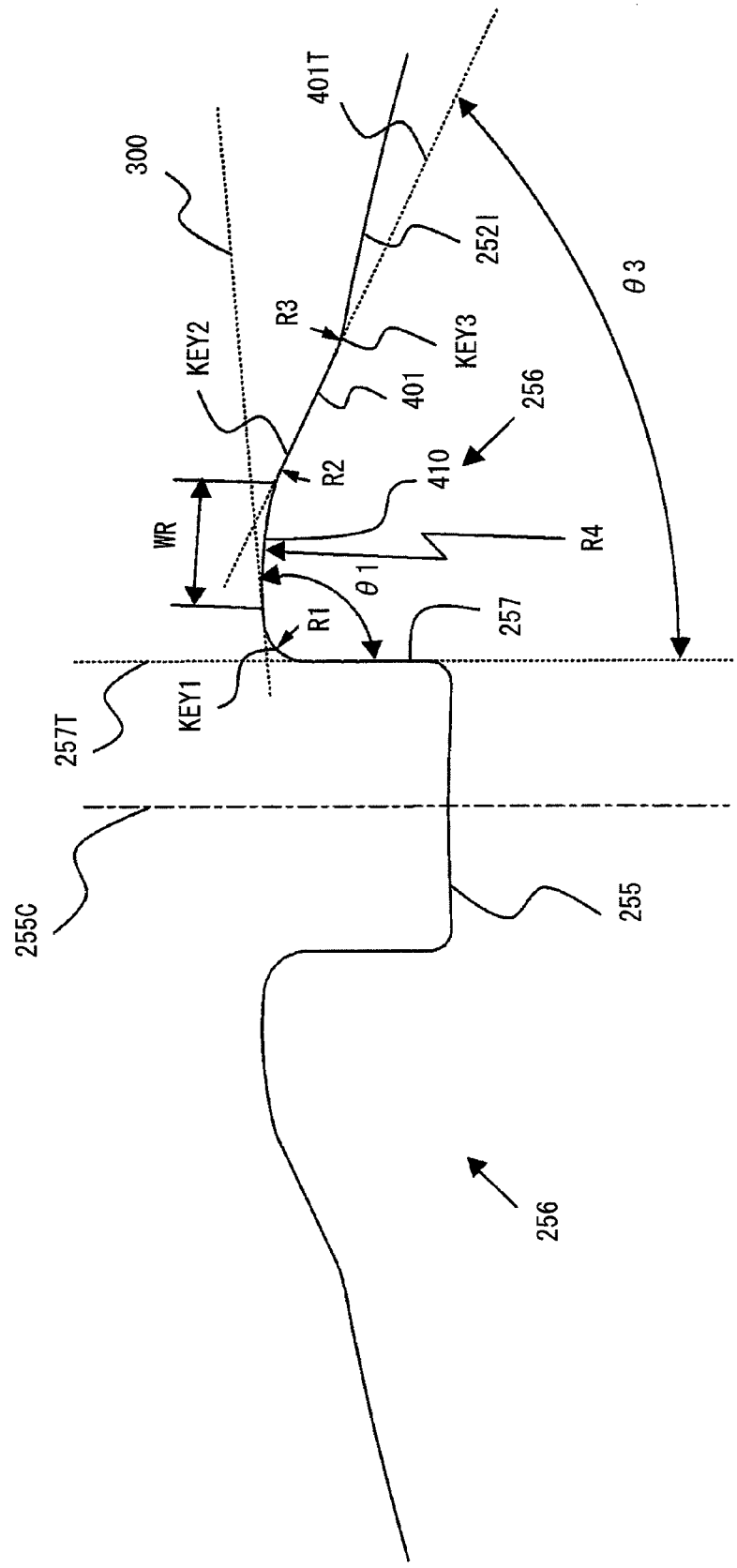
FIG. 22 A sectional view of the key at a rotor achieved in a second embodiment of the present invention FIG. 23 A graph indicating the relationship of the radius of a circular arc connecting the first corner portion and the second corner portion in the key shown in FIG. 22 to the level of stress
Figure 23:
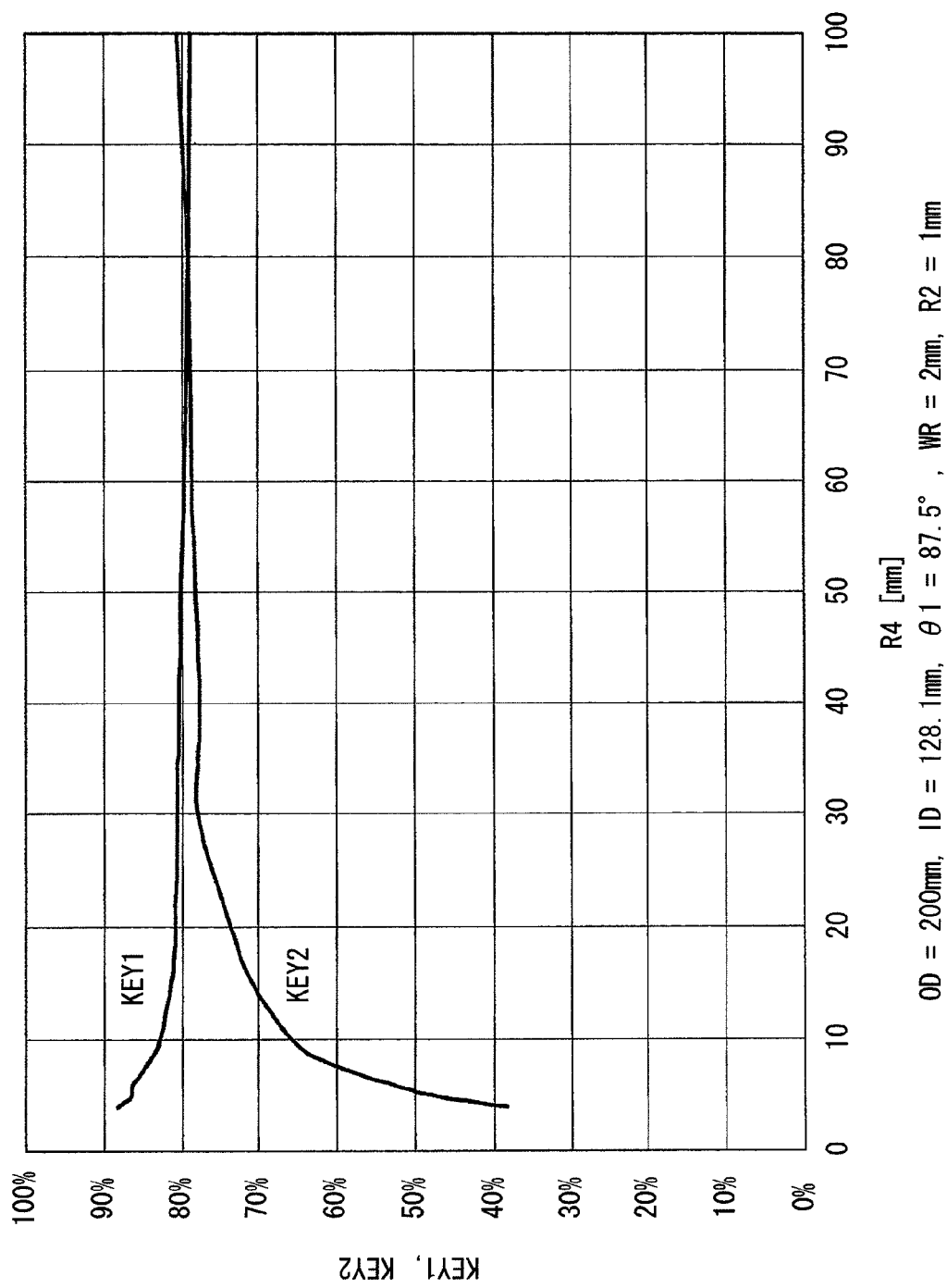

In reference to FIGS. 22 and 23, the second embodiment of the rotor and the rotating electric machine according to the present invention is described. In the second embodiment, a recessed circular arc contoured portion 410, recessed along the inner circumference, is formed instead of the planar portion 400 in the first embodiment. It is to be noted that the same reference numerals are assigned to portions identical or equivalent to those in the first embodiment so as to preclude the necessity for a repeated explanations thereof.

As shown in FIG. 22, the recessed portions 256 are each formed with a key side surface 257 of the key 255, a circular arc contoured portion 410 formed with a circular arc having a relatively large radius R4, located at the bottom of the recessed portions 256, a connecting side surface 401 extending from the inner circumference 252I of the rotor core 252 toward the circular arc contoured portion 410, a first corner portion key1 assuming the shape of a circular arc (having a radius R1), which connects the key side surface 257 with the planar portion 400, a second corner portion key2 assuming the shape of a circular arc (having a radius R2), which connects the planar portion 400 with the connecting side surface 401, and a bend portion key3 assuming the shape of a circular arc (having a radius R3) connecting the connecting side surface 401 with the inner circumference 252I.

The circular arc contoured portion 410, having a larger radius R4 and formed in place of the planar portion 400, can be regarded to range parallel to the tensile force F1, and under such circumstances, the extent of stress concentration in the circular arc contoured portion 410 may be regarded as insignificant.

The angle θ1 in the second embodiment should be defined as the angle formed by a tangential line 257T of the circular arc R1 at the connecting point at which the key side surface 257 connects with the circular arc R1 and a tangential line 300 of the circular arc R1 at the connecting point at which the circular arc contoured portion 410 connects with the circular arc R1. Such an angle θ1 can be controlled through an approach substantially similar to that described in reference to the first embodiment.

In addition, an angle θ3, instead of the angle θ2, is defined as the angle formed by a tangential line 401T of the circular arc R2 at the connecting point at which the connecting side surface 401 connects with the circular arc R2 and the tangential line 257T of the circular arc R1 at the connecting point at which the key side surface 257 connects with the circular arc R1.

As FIG. 23 indicates, the level of stress in the first corner portion key1 starts to decrease more gently when the radius R4, increasing gradually, becomes substantially equal to 20 mm, at a rotor 250 assuming the following dimensions; outer diameter OD=200 mm, inner diameter ID=128.1 mm, WR=2 mm, θ1=87.5° and θ3=60°. In contrast, the level of stress in the second corner portion key2, which initially increases rapidly, settles at a substantially constant value once the radius R4 becomes substantially equal to 30 mm.

FIG. 23 clearly demonstrates that the radius R4 should be set equal to or greater than 1/10 of the inner radius (ID/2) of the rotor core 252 in order to lessen the stress concentration at the circular arc contoured portion 410 to a level low enough to be disregarded.

In addition, the length of the circular arc contoured portion 410 can be represented by the distance WR from the connecting point at which the circular arc contoured portion 410 connects with the circular arc R2, to the key side surface 257.

It is to be noted that once the angle θ1, the distance WR and the radius of curvature pertaining to the radius R4 are determined, the position of the center of the circle with the radius R4 can be automatically determined.

It is to be noted that θ1 and θ3 may be defined in reference to the central line 255C running through the key 255 as has been explained in reference to the first embodiment. Furthermore, the key 255 and the recessed portions 256 can be formed through a punching process, as are the key and recessed portions in the related art, without leading to an increase in the manufacturing cost.

The rotor 250 achieved in the second embodiment as described above includes a rotating shaft 218 with at least one keyway 261 formed at the outer circumferential surface thereof and ranging along the axial direction, and a rotor core 252 that includes a key 255, to be fitted into the keyway 261, which projects out on the inner circumferential side. In addition, the recessed portions 256, which become wider further outward along the radius of the rotor core 252, are formed near the key at the rotor core 252. The recessed portions 256 each include, at least, a recessed circular arc contoured portion 410 having a relatively large radius formed thereat, and as a result, the stress level on the two sides of the key facing opposite each other along the circumferential direction is lessened via the recessed circular arc contoured portions 410.

The radius of curvature of the circular arc contoured portion 410 located at the bottom of each recessed portions 256 in the rotor 250 achieved in the second embodiment is determined as described below. Namely, the radius of curvature R4 is determined so that the level of stress occurring near the key 255 due to the centrifugal force acting on the rotor core 252 as the rotor 250 rotates never exceeds a predetermined threshold value. The radius R4 of the circular arc contoured portion 410 may be set, for instance, to a value equal to or greater than ⅒ of the inner radius ID of the rotor core 252. It is to be noted that the radius R4 of the circular arc contoured portion 410 in the second embodiment is determined by further taking into consideration the radius of curvature R1 of the circular arc contoured portion at the first corner portion key1 and the radius of curvature R2 of the circular arc contoured portion at the second corner portion key2.

The rotor in the second embodiment structured as described above achieves advantages similar to those of the first embodiment. In addition, since the angles formed at the recessed portions achieved in both the first embodiment and the second embodiment are greater than that of the recessed portions in FIG. 5, the life of the press die used in a press-forming process can be lengthened.

While the present invention is adopted in motors used to drive vehicles in the description provided above, the present invention is not limited to this example and it may be adopted in any of various types of motors. Furthermore, it may be adopted in any of various types of rotating electric machines other than motors, such as generators. As long as the features characterizing the present invention are not compromised, the present invention is in no way limited to the particulars of the embodiments described above.

It is to be noted that the present invention is not limited to the examples described above and may instead be adopted in conjunction with the expensive, high tensile strength steel sheets often used in rotor cores in the related art. Namely, by adopting the present invention in conjunction with high tensile strength steel, a rotor core assuring even greater strength can be provided, which, in turn, makes it possible to provide a rotating electric machine capable of rotating at an even higher rotation rate.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

The disclosure of the following priority application is herein incorporated by reference:
Japanese Patent Application No. 2010-031182, filed Feb. 16, 2010

The invention claimed is:

1. A rotor, comprising:
    a rotating shaft with at least one keyway formed at an outer circumferential surface thereof and ranging along an axial direction; and
    a rotor core that includes a key that projects out on an inner circumferential side thereof, and is fitted in the keyway, wherein:
    a recessed portion that widens outward along a radial direction is formed at each of two sides of the key facing opposite each other along a circumferential direction at the rotor core;
    a planar portion is formed at a bottom area of the recessed portion so as to lessen stress occurring on each of the two sides of the key facing opposite each other along the circumferential direction;
    the planar portion is a straight contoured portion extending over a predetermined length along a direction perpendicular to a direction in which the key projects out, and a connecting side surface extending to an inner circumference of the rotor core is formed continuously to an end of the straight contoured portion located on a side opposite from a key side where a key is present;
    a first corner portion, connecting a side surface of the key with a key-side end of the straight contoured portion, is formed as a circular arc contoured portion;
    a second corner portion, connecting the end of the straight contoured portion, located on the side opposite from the key side, with the connecting side surface, is formed as a circular arc contoured portion; and
    the predetermined length of the straight contour portion of the planar portion, an angle formed by the side surface of the key and the straight contoured portion, an angle formed by the straight contoured portion and the connecting side surface, a radius of curvature of the first corner portion and the radius of curvature of the second corner portion are determined so as to substantially equalize stress levels in the first corner portion as a stress concentration portion and in the second corner portion as a stress concentration portion,
    wherein the second corner portion is located outward in a radial direction compared to the first corner portion.

2. The rotor according to claim 1, wherein:
    an angle formed by the side surface of the key and the bottom area is greater than 90°.

* * * * *